(12) United States Patent
Todd et al.

(10) Patent No.: US 8,438,342 B1
(45) Date of Patent: May 7, 2013

(54) AUTOMATED APPLICATION-BASED STORAGE PROVISIONING

(75) Inventors: Stephen Todd, Shrewsbury, MA (US); Paul J Caruso, Danville, NH (US)

(73) Assignee: EMC Corporation, Hopkinton, MA (US)

(*) Notice: Subject to any disclaimer, the term of this patent is extended or adjusted under 35 U.S.C. 154(b) by 264 days.

(21) Appl. No.: 12/653,162

(22) Filed: Dec. 9, 2009

(51) Int. Cl.
*G06F 12/02* (2006.01)

(52) U.S. Cl.
USPC ............ 711/153; 711/108; 711/E12.005

(58) Field of Classification Search ......... 711/108, 711/153, E12.005, E12.019
See application file for complete search history.

(56) References Cited

U.S. PATENT DOCUMENTS

| | | | |
|---|---|---|---|
| 6,401,097 B1 * | 6/2002 | McCotter et al. ............ 1/1 |
| 6,807,632 B1 | 10/2004 | Carpentier et al. |
| 6,976,165 B1 | 12/2005 | Carpentier et al. |
| 7,159,070 B2 | 1/2007 | Kilian et al. |
| 7,162,571 B2 | 1/2007 | Kilian et al. |
| 7,240,150 B1 | 7/2007 | Todd et al. |
| 7,240,151 B1 | 7/2007 | Todd et al. |
| 7,249,251 B2 | 7/2007 | Todd et al. |
| 7,263,576 B2 | 8/2007 | Todd |
| 7,278,003 B1 | 10/2007 | Barrow |
| 7,281,084 B1 | 10/2007 | Todd et al. |
| 7,320,059 B1 | 1/2008 | Armangau et al. |
| 7,350,041 B1 | 3/2008 | Armangau et al. |
| 7,366,836 B1 | 4/2008 | Todd et al. |
| 7,376,681 B1 | 5/2008 | Todd et al. |
| 7,392,235 B2 | 6/2008 | Armangau et al. |
| 7,398,391 B2 | 7/2008 | Carpentier et al. |
| 7,415,731 B2 | 8/2008 | Carpentier et al. |
| 7,428,611 B1 | 9/2008 | Todd et al. |
| 7,428,621 B1 | 9/2008 | Todd et al. |
| 7,430,645 B2 | 9/2008 | Todd et al. |
| 7,444,389 B2 | 10/2008 | Kilian et al. |
| 7,523,231 B1 | 4/2009 | Gupta et al. |
| 2004/0243692 A1 * | 12/2004 | Arnold et al. .............. 709/220 |
| 2005/0033936 A1 * | 2/2005 | Nakano et al. ............. 711/170 |
| 2005/0125411 A1 * | 6/2005 | Kilian et al. ................ 707/10 |
| 2005/0160428 A1 * | 7/2005 | Ayachitula et al. ......... 718/104 |
| 2007/0185902 A1 * | 8/2007 | Messinger et al. ....... 707/103 R |
| 2007/0283119 A1 * | 12/2007 | Sarkar et al. .............. 711/170 |
| 2008/0209138 A1 * | 8/2008 | Sheldon et al. ............ 711/154 |
| 2009/0300184 A1 * | 12/2009 | Karve et al. ............... 709/226 |
| 2010/0131547 A1 * | 5/2010 | Magrath et al. ............ 707/769 |
| 2010/0146589 A1 * | 6/2010 | Safa .............................. 726/3 |

* cited by examiner

*Primary Examiner* — Hal Schnee
(74) *Attorney, Agent, or Firm* — Muirhead and Saturnelli, LLC

(57) ABSTRACT

Described are techniques for automatically provisioning storage for an application. A request to provision object-based storage for the application in a data storage system is received. The request identifies the application and is received from a user interface interacting with the data storage system at a specified one of a plurality of user levels, each of said plurality of user levels being associated with a different level of abstraction with respect to first processing performed in implementing the request. The first processing is performed to provision object-based storage for the request. The first processing is determined in accordance with the application and includes a level of automation varying in accordance with the specified user level at which the user interface interacts with the data storage system. The automation includes selecting one or more default options in accordance with best practices of the application.

21 Claims, 15 Drawing Sheets

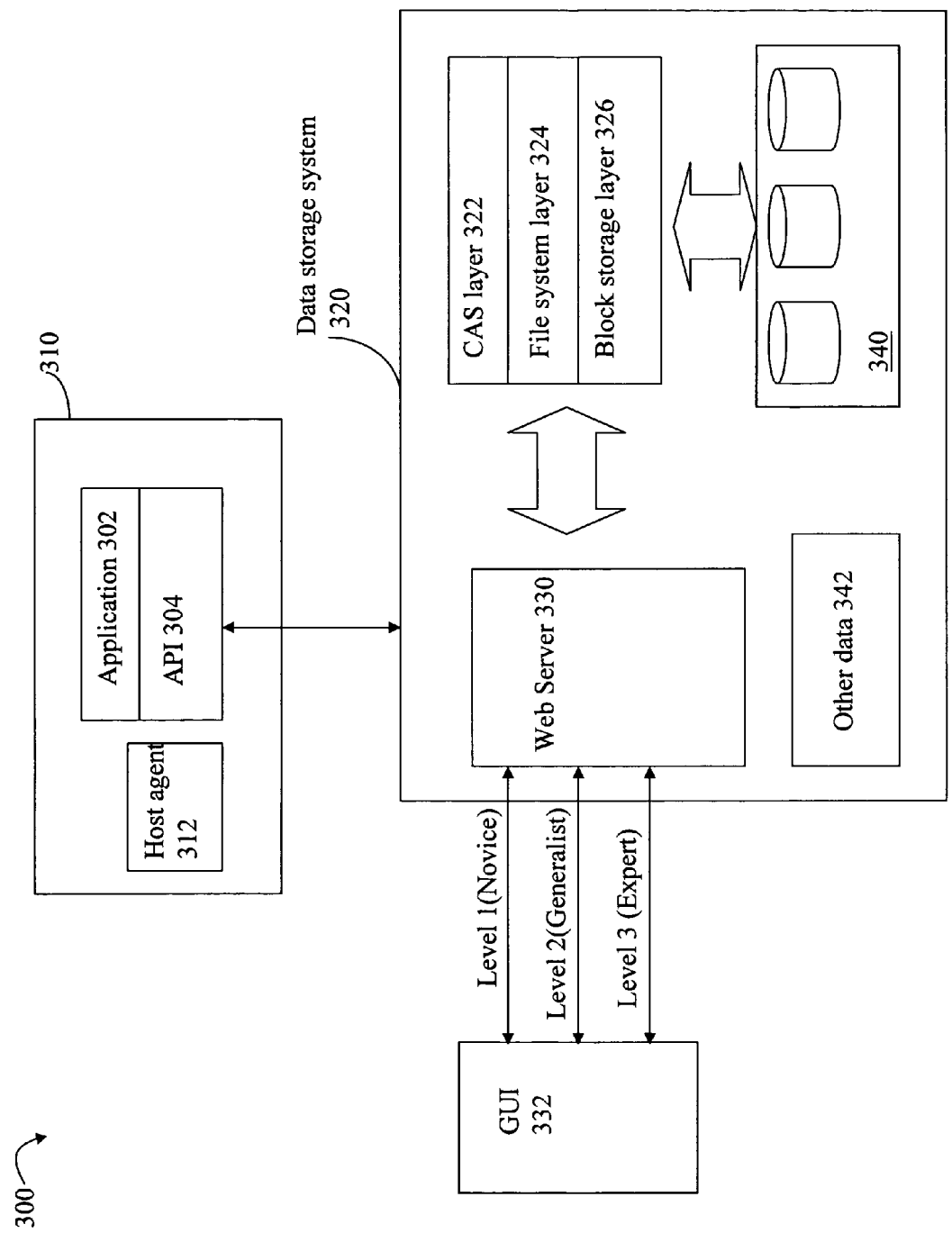

AUTOMATED APPLICATION-BASED STORAGE PROVISIONING

BACKGROUND

1. Technical Field

This application generally relates to data storage, and more particularly to techniques used for data storage configuration and provisioning.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Different tasks may be performed in connection with a data storage system. For example, a customer may perform data storage configuration tasks. Such tasks may include, for example, configuring storage for use with a particular software application. In connection with the configuration processing, tasks may include allocating storage, specifying the logical and/or physical devices used for the storage allocation, specifying whether the data should be replicated, the particular RAID (Redundant Array of Independent or Inexpensive Disks) level, and the like. With such options in connection with performing the configuration, a customer may not have the appropriate level of sophistication and knowledge needed.

Thus, it may be desirable to utilize a flexible technique which assists customers in connection with performing data storage services such as related to data storage configuration. It may be desirable that the technique be adaptable to the particular knowledge level of the user.

SUMMARY OF THE INVENTION

In accordance with one aspect of the invention is a computer implemented method of provisioning storage for an application. A request to provision object-based storage for the application in a data storage system is received. The request identifies the application and is received from a user interface interacting with the data storage system at a specified one of a plurality of user levels. Each of the plurality of user levels is associated with a different level of abstraction with respect to first processing performed in implementing the request. The first processing is performed to provision object-based storage for the request. The first processing is determined in accordance with the application and includes a level of automation varying in accordance with the specified one user level at which the user interface interacts with the data storage system. The automation includes selecting one or more default options in accordance with best practices of the application. The first processing may include automatically configuring at least one virtual storage pool for storing objects used by the application. The at least one virtual storage pool may be configured using at least one default value determined in accordance with best practices for the application. The at least one default value may be specified in a rule of a rule set which is processed as part of said first processing. The plurality of user levels may include a first level associated with a novice user providing a greatest level of abstraction and automation of all of said plurality of levels. Each of the plurality of user levels may allow for specifying a varying degree of optional input with the request in accordance with a level of abstraction associated with said each user level. Automatically configuring at least one virtual storage pool may include automatically configuring at least one block storage device in accordance with best practices for the application. Automatically configuring at least one virtual storage pool may include automatically configuring at least one file system on said at least one block storage device, said at least one file system being selected in accordance with best practices for the application, and automatically configuring said at least one virtual storage pool on said at least one file system. The method may also include storing one or more settings for the application wherein at least a first of the settings is specified as an additional user-provided input when interacting with the data storage system at a first of said plurality of user levels, and wherein, when interacting with the data storage system at a second of said plurality of user levels rather than said first user level, said first setting is automatically specified by a default value rather than as said additional user-provided input. The first processing may include automatically creating a first default retention class and indicating that objects which are created by the application and stored in a first of the at least one virtual storage pool each have an attribute of the default retention class, the default retention class indicating an amount of time that said each object is not allowed to be deleted from the first virtual storage pool. The first processing may include automatically specifying a portion of metadata and indicating that the portion of metadata is included in object metadata for each object stored in a first of the at least one virtual storage pool. Each object stored in the object-based storage system may be stored in one of a plurality of virtual storage pools, each of said plurality of virtual storage pools being associated for use with one or more particular applications. The first processing may include automatically determining a level of access including allowable operations that may be performed by the application with respect to objects included in the at least one virtual storage pool. Each object may include content and object metadata. The object metadata may include a content-based address determined based on the content of said each object. The at least one file system may be selected based on any of an expected size and expected frequency of use associated with objects included in said at least one virtual storage pool. The settings for the application may include at least one of a size and file format, wherein a request to store an object in said at least one virtual storage pool may not be allowed if the object does not have associated content and metadata in accordance with the settings. The settings for the application may identify at least one portion of metadata that is automatically included in object metadata for each object stored in said at least one virtual storage pool. The one or more default options may be encoded in rules processed by the data storage system. The first processing may include generating an application profile including authentication and security information for use by the application when issuing a request to operate on an object, and providing the application profile to a host agent of the host where the application is configured to execute.

In accordance with another aspect of the invention is a computer readable medium comprising executable code stored thereon that receives a request to provision object-based storage for an application in a data storage system. The request identifies the application and being received from a user interface interacting with the data storage system at a specified one of a plurality of user levels. Each of the plurality of user levels is associated with a different level of abstraction with respect to first processing performed in implementing the request. The computer readable medium also includes code that performs said first processing to provision object-based storage for the request. The first processing is determined in accordance with the application and includes a level of automation varying in accordance with the specified one user level at which the user interface interacts with the data storage system. The automation includes selecting one or more default options in accordance with best practices of the application.

BRIEF DESCRIPTION OF THE DRAWINGS

Features and advantages of the present invention will become more apparent from the following detailed description of exemplary embodiments thereof taken in conjunction with the accompanying drawings in which:

FIG. 4 is an example illustrating data flow and interaction between components of a system in accordance with techniques herein;

DETAILED DESCRIPTION OF EMBODIMENT(S)

Figure 1:
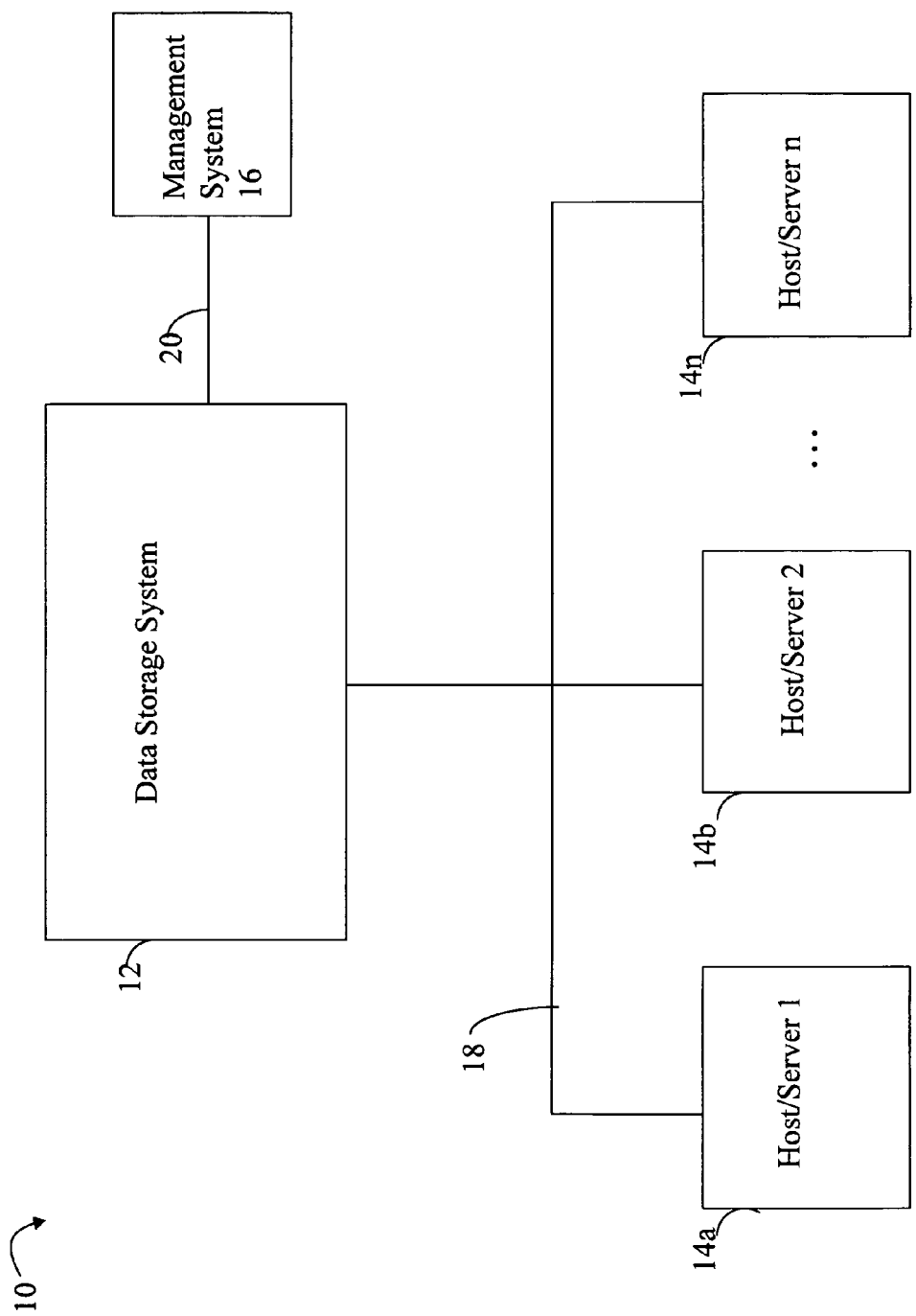
FIG. 1 is an example of an embodiment of a system that may utilize the techniques described herein.

Referring to FIG. 1, shown is an example of an embodiment of a system that may be used in connection with performing the techniques described herein. The system 10 includes one or more data storage systems 12 connected to server or host systems 14a-14n through communication medium 18. The system 10 also includes a management system 16 connected to one or more data storage systems 12 through communication medium 20. In this embodiment of the system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hard-wired connection(s) by which the host systems 14a-14n may access and communicate with the data storage systems 12, and may also communicate with other components (not shown) that may be included in the system 10. In one embodiment, the communication medium 20 may be a LAN connection and the communication medium 18 may be an iSCSI or Fibre channel connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the one or more data storage systems 12 of FIG. 1 may be an appliance with hardware and software for hosting the data storage of the one or more applications executing on the hosts 14a-14n. The appliance may include one or more storage processors and one or more devices upon which data is stored. The appliance may include software used in connection with storing the data of the hosts on the appliance and also software used in connection with configuring the data storage for use by the hosts in connection with techniques described herein. As an example in connection with a medical office application server component that may executed on one or more of the hosts 14a-14n, the data storage configuration tasks may include allocating or provisioning storage for storing patient medical data such as, for example, name, address, insurance information, office visit dates, vaccination records, payments, image files containing x-rays, and the like. Tasks performed in connection with provisioning storage to store patient medical data for the medical office application may include, for example, specifying the devices (logical and/or physical) used to store the data, configuring the data storage devices used such as specifying whether data replication is performed for disaster recovery, and the like. Techniques that may be used in connection with performing data storage provisioning and configuration are described in more detail in following paragraphs in order to provide ease of use to customers of the data storage system(s) 12.

In connection with an embodiment in which the data storage 12 is an appliance including hardware and software, the appliance may also include other software for performing different data services. For example, the appliance may include backup server software which interacts with software on the hosts 14a-14n when performing a backup operation.

In another embodiment, the data storage systems 12 may include one or more data storage systems such as one or more of the data storage systems, such as data storage arrays, offered by EMC Corporation of Hopkinton, Mass. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein for processing a data storage configuration request.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

In following paragraphs, reference may be made to a particular embodiment such as, for example, an embodiment in which element 12 of FIG. 1 is an appliance as described above. However, it will be appreciated by those skilled in the art that this is for purposes of illustration and should not be construed as a limitation of the techniques herein.

Described in following paragraphs are techniques that may be used to assist customers of a data storage system in connection with performing data storage services such as related to data storage system configuration, provisioning of data storage, and the like. The techniques herein are adaptable to the particular knowledge level of the user. The techniques are flexible and allow for implementation of best practices and defaults in an automated fashion which are customized for the particular application, user or customer, and/or underlying data storage system and environment to meet specific customer needs. As will be described in more detail, depending on the level at which a user interacts with the data storage system, different levels or amounts of automation of the best practices may be performed. The user may elect to bypass the automation of best practices or limit the amount of automation performed by interacting with the system at various levels.

Figure 2:
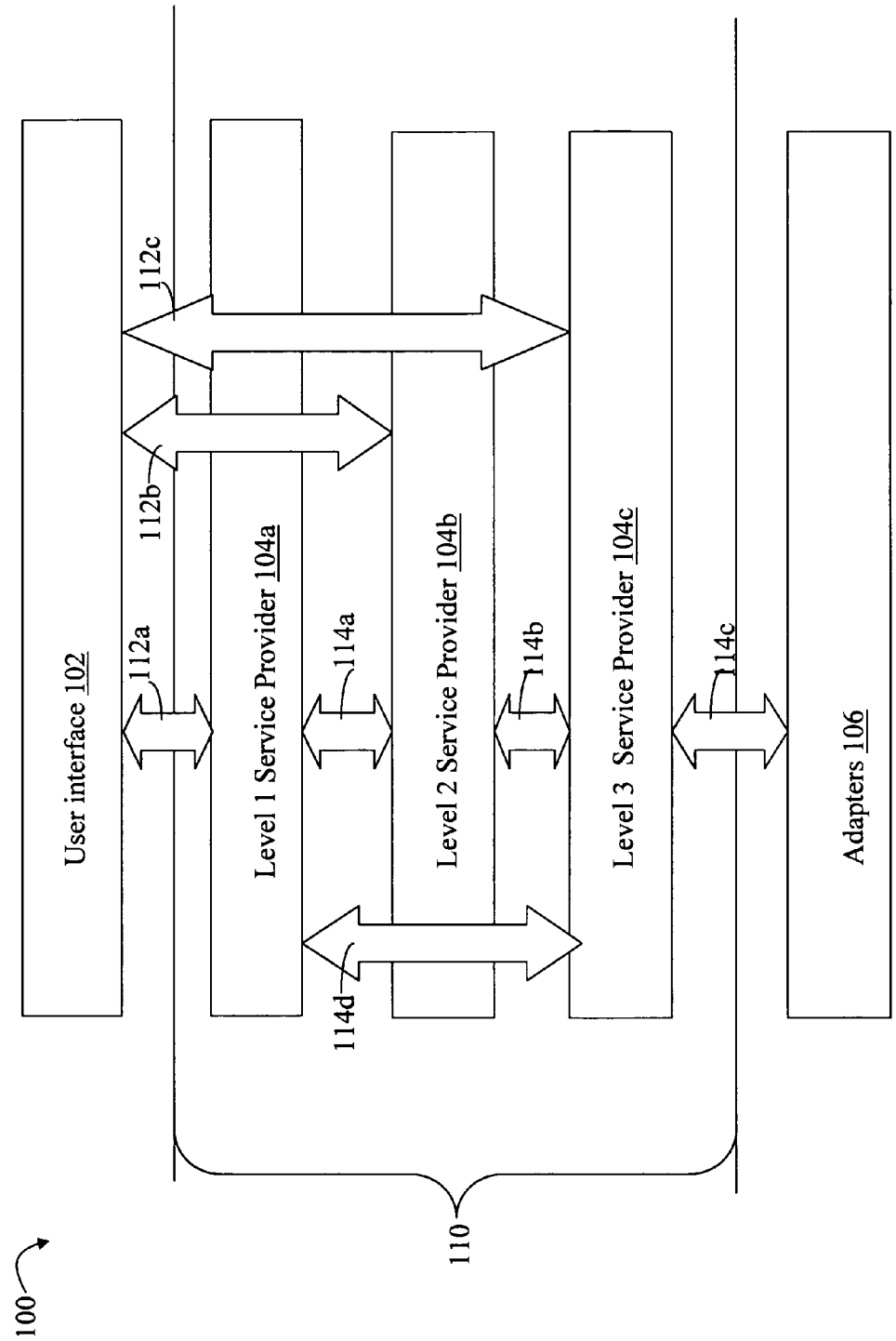
FIGS. 2 and 3 are examples of components that may be included on the data storage system for use in performing the techniques herein.

Referring to FIG. 2, shown is an example representation of components that may be included on the data storage system 12 for use in performing the techniques herein for data storage configuration. The example 100 includes a user interface 102, one or more levels of service providers 110, and adapters 106. In the example 100, the element 110 includes 3 service provider layers or levels 104a-104c. It should be noted that although 3 service provider levels are shown in FIG. 2, an embodiment may include any number of service provider levels.

The adapters 106 are used in connection with facilitating communications between the service providers, such as the level 3 service provider 104c, and other components. The different service providers included in the example 100 may be able to communicate directly with one another. However, when one of the service providers at one of the levels communicates with another component other than one of the service providers, an adapter may be utilized. An adapter may be characterized as a layer of software between one of the service providers, such as service provider 104c, and another component, such as a lower-level component invoked to implement data storage platform specific functionality. An adapter 106 may convert a service provider API to the API of another component. As an example, the service provider 104c may perform a call to an external component to create a file system. An adapter 106 may be used as an intervening layer between 104c and the external component in which the adapter 106 converts the API call from 104c to the API of the external component. The conversion may include, for example, mapping parameters between the API calls, performing multiple calls to the external component for the one API call from 104c, and the like. It should be noted that an adapter 106 may not utilized if such conversion is not needed.

The user interface (UI) 102 provides for one or more different types of user interfaces and associated data. For example, the UI 102 may provide support for a graphical user interface (GUI), command line interface (CLI), and the like, to support interactions between the data storage system 12 and the hosts 14a-14n of FIG. 1. Each of the different service provider levels of 110 may provide a different logical view and level of abstraction with respect to a data storage configuration task to be performed for an application executing on one of the hosts. In connection with the techniques herein, a user may interact through the UI 102 with any one of the different levels of service providers 104a-104c when performing data storage configuration requests. Each of the service providers of 110 may provide a different level of detail or abstraction with respect to the underlying operations and tasks performed on the data storage system in accordance with different levels of user sophistication and knowledge. As will be described in more detail below, the language or terminology, UI data (e.g., content or data used to populate the UI menus), and UI presentation or structure (e.g., commands presented or particular hierarchical menu structure) may vary in accordance with the particular level of service provider selected by the user. Thus, a user may interact with the data storage system at a variety of different levels when issuing data storage configuration requests for the same application. The UI may be customized for the particular level and application for which the request is performed.

In an embodiment, the UI 102 may be characterized a set of different user interfaces that may vary depending on the target user and associated user level at which the user interacts with the system. As described in more detail in following paragraphs, each level may provide a different user interface for a different level of user interaction and level of knowledge and sophistication. Each level may also be associated with a different level of automation of the best practices, for example, with users interacting at level 1 obtaining the greatest amount of automation of best practices and users interacting at level 3 obtaining none or minimal amount of automation. The UI 102 may provide multiple different user interfaces in accordance with the different levels allowing a user the option of connecting and interacting with the data storage system at any level. By allowing a user to select a level of interaction and automation, the techniques herein provide a user with a flexible approach to choose deeper levels and entry points (e.g., level 3) providing less automation and more detail as well as selection of other levels (e.g., level 1) when greater automation of best practices is desirable.

For example, level 1 service provider 104a may provide a beginner or most simplistic view of the data storage system and tasks performed for data storage configuration. Interaction with the level 1 service provider 104a requires the least amount of knowledge and may be geared toward interacting with users having minimal knowledge when performing a data storage configuration request by providing the greatest level of abstraction of the underlying system and operations performed. The language may be more non-technical in comparison to the interface language of other levels. As the level increases, so does the assumed level of knowledge of the user in connection with interactions. Level 3 service provider in the example 100 may be utilized by the most knowledgeable users providing a greatest granularity of control of all levels in connection with a data configuration request. Level 3 exposes more detailed information to the user than interactions at levels 1 and 2. As an example, a level 1 user may issue a data storage configuration request to provision storage for storing patient data of medical office application executing on one of the hosts. The level 1 user may specify a minimal amount of information in connection with the request such as only a number of patients for which storage is to be provisioned. A user may interface with the data storage system using a GUI and issue the data storage configuration request. The language and terminology of user interactions via the GUI may be customized for the level 1 user of the medical office application. In connection with the same medical office application, a more knowledgeable user may choose to issue a data storage configuration request via a GUI for a same number of patients by interacting with level 3 service 104c. At level 3, the user provides more detailed information about the request such as, for example, regarding the underlying data storage device and how this data storage device is used by the application. To further illustrate, the level 3 data storage configuration request may specify the physical and/or logical devices upon which storage is allocated, provide vendor-specific attributes or settings, indicate a number and type of file or records created, and the like. In connection with the type of file created, this may be particular to the medical office application. In connection with the user communicating with the level 1 service provider, such detail is not provided and defaults may be specified by the data storage system when implementing the level 1 data storage configuration request. The defaults may be customized for the particular application.

When implementing the request, the level 1 service provider may communicate with one or more other level service providers such as 104b and 104c. Different defaults for the particular application may be used by service providers 104b and 104c. For example with reference to the level 1 request for the email application described above, the level 1 service provider 104a may communicate with the level 2 service provider 104b. Provider 104b may then communicate with the level 3 service provider 104c to implement the request and allocate the requested storage along with specifying other defaults such as, for example, a default level of data protection. The service provider 104c may communicate with other data storage system hardware and/or software when implementing the configuration request.

As illustrated in the example 100, a service provider at a level n may generally communicate, directly or indirectly, with one or more other service providers at levels lower than level n when processing a data storage configuration request. A user may select the level of interaction and the user's data configuration request is received at the data storage system by the UI 102. The UI 102 in turn communicates with the appropriate level service provider to initiate the request. Furthermore, a request received at a first level can result in multiple requests to a lower level to perform an operation. For example, a user may connect to the data storage system 12 at level 1 104a. In response, the level 1 service provider 104a may issue more than one request to provider 104b. In turn, each request to provider 104b may result in one or more requests to provider 104c which, in turn, communicates with adapters and other code modules to perform the requested operation.

The data storage configuration request may identify the user (e.g., by user identifier or other authentication information), the application for which the request is being made, and any user selections or input parameters.

In one embodiment, the service providers 104a-104c may be code modules which are included in the same appliance. Each of the service providers 104a-104c may provide a published interface or API (application programming interface). A first service provider at level n may issue a request of another lower level service provider by issuing an API call to the lower level service provider. The API may also be used to facilitate communications between the UI 102 and the different level service providers of 110. As described in more detail in following paragraphs, an API call from a first service provider to a second service provide may use rules or mappings to map the data received by the first service provider to the appropriate API call with parameters and any defaults in accordance with the received data. Thus, the rules or mappings may be used to map between levels of abstractions of the different service providers.

Although an embodiment may have all service providers 110 located in the same appliance or other component, the service providers may be characterized as remotable. One or more of the service providers may be located on different components having connectivity so that the API calls between service providers may be remote API calls as well as local API calls (e.g., service providers on same component). As an example, an embodiment may have multiple data storage systems included in a network. Each of the service provider may be located on a different data storage system.

An embodiment may determine the level at which a user interacts with the system using a variety of different techniques. With reference to FIG. 2, a user may be allowed to interact at any of the 3 levels. The menus may be directed to a level 1 user. The user may select whether to interact at a lower level by selecting further detailed menu options providing more detailed information at lower levels. As a variation, a user may have associated roles or permissions. If the user does not have the associated roles or permissions to perform operations or view such detailed information associated with particular levels, the associated menu options, wizards, and the like, may not be displayed or may otherwise be disabled when interacting with the particular user.

As a variation to the foregoing, the levels exposed to a user may be limited in that a user may not be allowed to interact with one or more lower levels. For example, user interaction with the data storage system may start at level 1 and provide wizard or other menu options for more detailed selection by the user for level 2. However, information and interactions at level 3 may never be exposed if the product is intended only for a certain level of users or a particular target market. In other words, the capability to drill down and interact may be limited to only levels 1 and 2 but not level 3.

An embodiment may also utilize user preferences to determine the initial or default level of interaction and exposure. For example, user preference settings stored on the data storage system or on the host may specify a default level used for the user interface menus, language, and the like. No further detailed buttons or drill down capabilities may be provided via the interface unless the user changes his/her preferences and selects to apply such preferences. In such an embodiment, the user interface may be presented from a viewpoint of the user preferences having content, structure and an interface language/terminology in accordance with the selected level. The user preferences may be stored as configurable parameters or options on the appliance or remotely located, such as on the host, and used by the appliance. For example, the configuration file for the users may be stored on the host. An agent on the host may read the configuration file and communicate the preferences to software on the appliance providing data for populating and presenting the user interface. A user may change the preferences via menu options, directly editing a configuration file, and the like. As a user gains experience and knowledge, a user may select to interact at a lower level for some or all requests.

Figure 3:
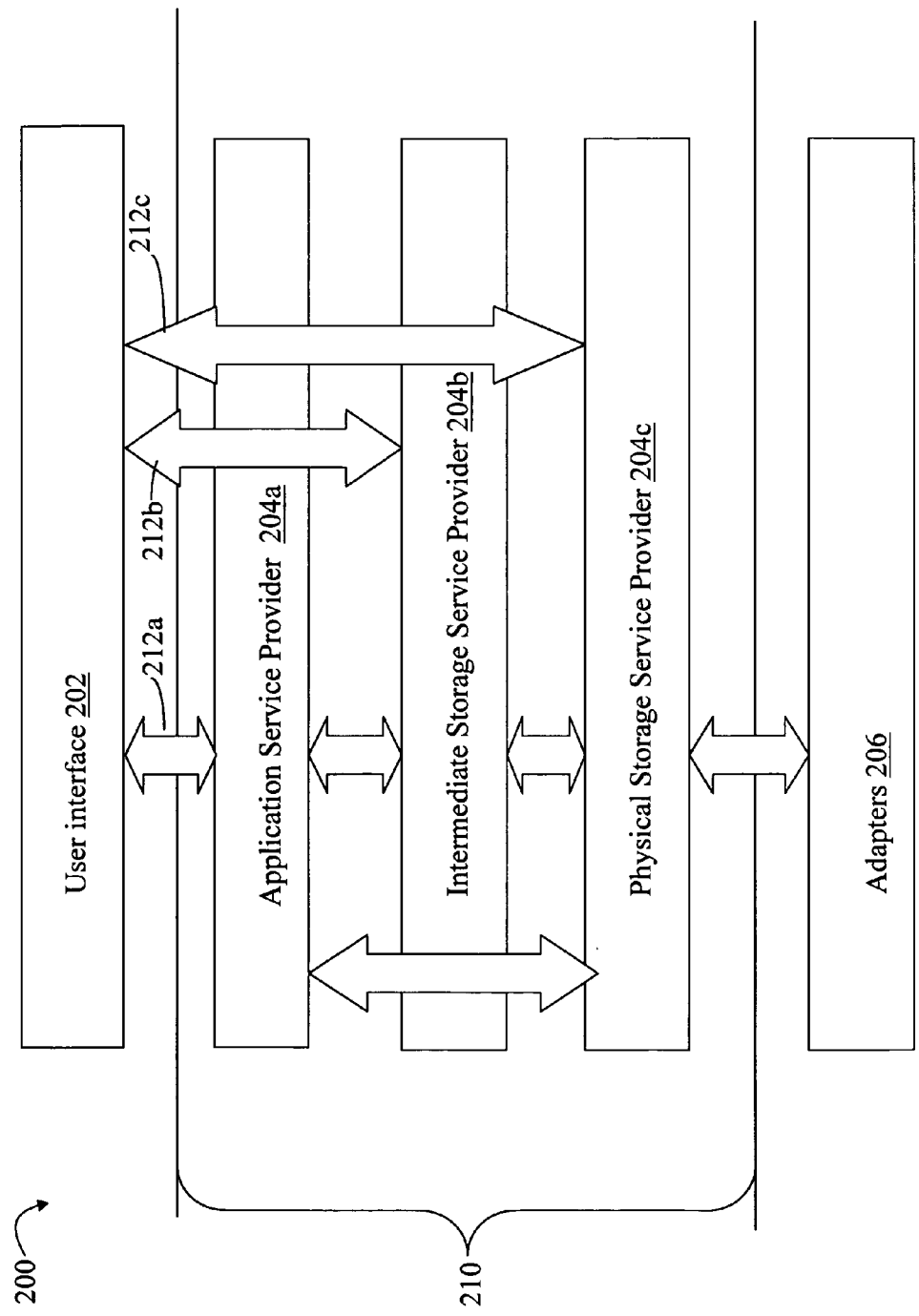

Referring to FIG. 3, shown is another example representation of components that may be included on the data storage system 12 for use in performing the techniques herein for data storage configuration. The example 200 is a more detailed illustration setting forth a particular instance of the different service providers and levels that may be included in an embodiment. Elements 202 and 206 are similar, respectively, to elements 102 and 106. Element 210 includes 3 service providers: application service provider 204a, intermediate or generic storage service provider 204b and physical storage service provider 204c. With respect to a level hierarchy, 204a may correspond to level 1 service provider 104a of FIG. 2, 204b may correspond to level 2 service provider 104b of FIGS. 2, and 204c may correspond to level 3 service provider 104c of FIG. 2.

The application service provider 204a may have an application-specific focus and provide a level of abstraction customized for an application such as, for example, a particular email application, law office application or medical office application, as well as a class of related applications, such as a multiple email applications. When interacting with provider 204a for a particular application, the interface language may vary with the application. For example, if the application is a law office application, the interface language, menu options, and the like, may be tailored to the law profession. Similarly, a medical office application may utilize an interface language, menu options, and the like, familiar to the medical office. As such, the application service provider 204a may use one set of rules or mappings for each application to implement the application specific best practices for the user level. A first set of rules for the medical office application may be used to map the user input parameters using medical office terminology to parameters for the appropriate API calls for other service providers 204b and/or 204c. A second set of rules for the law office application may be used to map the user input parameters using law office terminology to parameters for the appropriate API calls for other service providers 204b and/or 204c. The user connecting to the data storage system at the application service provider level 204a may be provided with a user interface customized for the selected level and application to perform a requested data storage configuration.

The intermediate storage service provider 204b may be an intermediate or second level of user interaction. As illustrated, the provider 204a may communicate with 204b when implementing a request for data storage configuration. In one embodiment, a user connecting to provider 204b may be provided with a generic level of interaction which may not be tailored for the particular application. In other words, the same language and user interface may be presented to a user for multiple applications such as the medical application or law office application. As a variation to the foregoing, the service provider 204b may be customized for each application and provide for a more detailed level of exposure that varies per application.

The physical storage service provider 204c provides the most detailed or greatest level of exposure of the underlying data storage system. The provider 204c may be customized for the particular storage vendor and associated options. The user interface for a user connected at level 3 to service provider 204c may include menu options and terms particular to the underlying storage vendor and the more knowledgeable user. For example, the user may specify particular devices, RAID levels and techniques, file types, SCSI and iSCSI terminology, and the like.

The best practices and the automation of the best practices as described in more detail in following paragraphs may be customized for a particular application and the particular data storage system and environment. In other words, the best practices may vary in accordance with the particular application as well as the underlying data storage system and environment. For example, different practices may be preferred for a same application as the underlying data storage system changes. In such an instance, for example, there may be a first set of mappings used for mapping level 204a information to level 204b providing automation of best practices for a user connecting at level 204a for the application. The same first set of mappings may be used even if the data storage system differs. Other mapping rules may be used to map level 204b information to level 204c information in accordance with the best practices for the underlying data storage system. As the data storage system changes, the mappings used for level 204b-level 204c mapping may change although the same first set of mappings may be used.

Providing different levels of application-specific user interaction as described above, where each level may vary with the knowledge required to perform a data storage configuration operation such as a provisioning request for a particular application, is further described, for example, in U.S. Pat. No. 7,523,231, Apr. 21, 2009, Gupta et al. APPLICATION AWARE STORAGE (the '231 patent), which is incorporated by reference herein. The '231 patent describes use of different application-specific user interactions with file systems and/or block storage in order to provide varying levels of automation in accordance with different levels of user knowledge for provisioning. As such, the '231 patent describes an embodiment in which a user may be exposed to varying levels of detail regarding file systems and block storage device configuration, where the level of detail exposed varies with a selected level of user interaction and expected knowledge or skill. The foregoing techniques may be further applied for use with provisioning storage for particular applications where data used by the applications may be stored as objects in an object-based storage system. In other words, a user may be exposed to varying levels of detail regarding options used with the object-based aspects or layer(s) of data storage in a manner similar to varying user exposure at varying levels to aspects of file system and/or underlying device configuration for block storage. This is described in more detail in following paragraphs and figures.

In an object-based storage environment, data may be stored as an object within a pool of objects. The object may be retrieved using an object identifier. An application referencing an object or performing an operation on an object (e.g., read, write, delete) may not specify a directory or device location for the object. Rather, the object may be referenced by the application using the object identifier, for example, to retrieve the previously stored content of the object. In one embodiment, the objects may be characterized as a flat, non-hierarchical pool where the object identifier allows retrieval of the object from the pool. As will be described in more detail, the object-based system may be implemented on top of one or more underlying technology layers such as a file system, block storage, and/or database. As such, the complexity of performing a data storage provisioning operation may further increase with object-based storage which may be implemented using one or more other technology layers (e.g., file system, block storage and/or a database).

An example of an object-based storage system is a content-addressable storage (CAS) system. In a CAS system, data or content of the object is stored using a content address generated based upon the contents of the data of the object itself. The content address may be generated by applying a hash function to the data to be stored. The content address may be mapped within the data storage system to one or more physical storage locations within the data storage system. More generally, CAS systems use techniques where stored objects may be identified based on the content. However, the techniques described herein may be used in other embodiments where an object identifier is determined in other ways rather than being based on the contents of the stored object itself. As such, although CAS is used to illustrate the techniques herein, it should be noted that CAS is only one exemplary implementation of an object-based storage system that may be used with techniques herein and the techniques herein should not be construed as being limited for use with a CAS object-based embodiment.

CAS systems are further described, for example, in U.S. Pat. No. 6,807,632, Oct. 19, 2004, CONTENT ADDRESSABLE INFORMATION ENCAPSULATION, REPRESENTATION, AND TRANSFER, Carpentier et al.; U.S. Pat. No. 6,976,165, Dec. 13, 2005, SYSTEM AND METHOD FOR SECURE STORAGE, TRANSFER AND RETRIEVAL OF CONTENT ADDRESSABLE INFORMATION, Carpentier et al.; U.S. Pat. No. 7,398,391, Jul. 8, 2008, CONTENT ADDRESSABLE INFORMATION ENCAPSULATION, REPRESENTATION, AND TRANSFER, Carpentier et al.; and U.S. Pat. No. 7,415,731, Aug. 19, 2009, CONTENT ADDRESSABLE INFORMATION ENCAPSULATION, REPRESENTATION, AND TRANSFER, Carpentier et al., all of which are incorporated by reference herein. Additionally, CAS is an example of object-based storage system that may be implemented on top of (i.e., using) one or more underlying technologies. For example, U.S. Pat. No. 7,376,681, May 20, 2008 to Todd et al., METHODS AND APPARATUS FOR ACCESSING INFORMATION IN A HIERARCHICAL FILE SYSTEM, which is incorporated by reference herein, describes use of a software CAS layer implemented on top of file system(s) and block storage so that the contents are ultimately stored on a block I/O storage system.

Referring to FIG. 4, shown is an example of an embodiment of a host communicating with a data storage system in accordance with techniques herein. The example 300 includes a host 310 and a data storage system 320. The host 310 may include one or more applications 302, an API (application programming interface) 304, and host agent 312. The data storage system 320 may include a web server 330, storage devices 340, and software executing thereon comprising CAS layer 322, file system layer 324 and block storage layer 326. GUI (graphical user interface) 332 may correspond to one type of UI represented by element 102 of FIG. 2 and element 202 of FIG. 3. The GUI 332 may provide functionality as described herein so that a user may interact with the data storage system 320 at any one of a plurality of levels when performing data storage management operations, such as storage provisioning requests. In the example 300, 3 levels (Novice, Generalist and Expert) are illustrated. In accordance with different levels of expertise or knowledge, each of the 3 user interaction levels may provide the user with different levels of automation and varying levels of exposure to details in connection with performing an operation such as for a storage provisioning request.

The GUI 332 may communicate with the web server 330 of the data storage system in connection with a request such as to provision storage for a particular application (e.g., application 302 of host 310). In turn, the web server 330 may communicate (directly and/or indirectly) with one or more other layers of software 322, 324 and 326 executing on the data storage system and with a host agent 312 in connection with performing the request, such as to provision storage for application 302. The web server 330 and/or other software executing on the data storage system 320 may also access other data 342 (e.g., application customization options, rules, and the like) in connection with performing processing of techniques described herein.

Application 302 executing on the host 310 may be, for example, an email application, a medical office application, a law office application, and the like. The application 302 may communicate with the data storage system 320 when issuing requests, such as to perform operations (e.g., read, write, modify) on application data stored as objects on the data storage system 320. In one embodiment as described below in more detail, data for an object may include the content and metadata describing the object such as in the form of object attributes (e.g., attribute name=value pairs). Examples of metadata may include a creation date or timestamp, object name specified as a character string, other string descriptors where a common string descriptor may be associated with and used to identify particular sets of objects (e.g., name of application or host associated with creating the object or last modifying the object, application version number, corporate division), and the like. The application 302 may communicate with the data storage system 320 using API 304. The API 304 may be, for example, code of a software development kit (SDK) for use when interfacing with CAS layer 322 to perform operations on the application data stored on devices 340. The host agent 312 may be software executing on the host 310 used in connection with techniques herein as will be described in following paragraphs. The host agent 312 may, for example, communicate with the GUI 332 in connection with configuring the host with authentication information used, for example, when the application 302 issues a request using API 304 to store data on the data storage system in accordance with an object-based storage system such as system 320 using CAS 322.

In connection with using CAS or another object-based storage system or layer, it should be noted that an embodiment may implement the CAS layer using one or more other software technologies than as illustrated in the example 300. The example 300 illustrates CAS 322 being implemented using file systems and block storage. However, CAS 322 may be implemented using other layers and associated technologies. For example, CAS 322 may be implemented on top of, or using, a database rather than a file system 324. The database may then use functionality represented by the block storage layer 326.

In one embodiment as will be described in more detail in following paragraphs, each of the 3 levels—denoted in FIG. 4 as Novice, Generalist and Expert—may provide a different level of automation and varying level of exposure to details, options and the like, associated with performing a requested application-specific operation, such as to provision storage for the application 302 on host 310. In accordance with techniques herein, as described in the '231 patent, each of the 3 levels may provide varying levels of automation and exposure to details of the file system and block storage layers when implementing a request to provision storage. Additionally, as described in more detail below, each of the 3 levels may provide a corresponding level of automation and exposure to details of the CAS layer 322 when implementing a request to provision storage.

Prior to describing features of an object-based system that may be automated in accordance with application-specific best practices for storage provisioning and may be exposed in varying degrees in accordance with different levels of user interaction, details regarding a storage object that may be used with techniques herein are set forth.

Figure 4A:
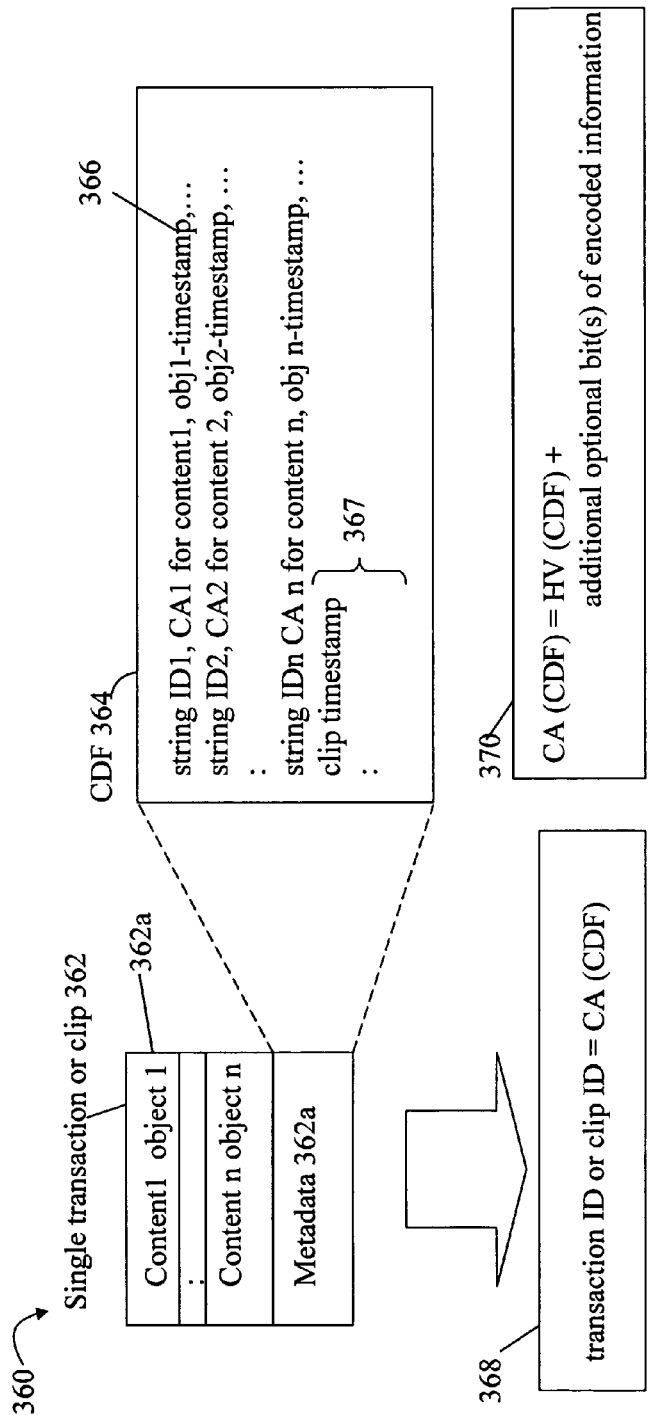
FIG. 4A is an example illustrating portions of content and metadata for objects in an embodiment in accordance with techniques herein.

Referring to FIG. 4A, shown is an example illustrating additional detail regarding objects as may be used in an embodiment in connection with techniques herein. The example 360 illustrates a single transaction or clip 362 that may include contents for one or more objects and associated metadata 362a. The metadata 362a in one embodiment may be referred to as a content descriptor file (CDF) 364 and may include the metadata for the objects of the clip 362 as well as additional metadata that may characterize the entire transaction or clip 362. The CDF 364 is illustrated as including a line of metadata for each object of 362 and other clip or transaction metadata 367. To further illustrate, CDF 364 includes the object metadata 366 corresponding to object 1 362a. Object 1 metadata 366 may include a string ID1, a content address (CA) for content1 of object 1 (denoted CA1), a timestamp (denoted obj1-timestamp) indicating the time of object creation, and the like. String ID1 of 366 may be a character string used by the application to refer to object 1 by name. In one embodiment as described herein, each CA for an object, such as CA1, may be determined based on the contents of the object itself. The CA may be determined, for example, based on a hash value of the contents of the object. The CA may also optionally include one or more other encoded bits of information that may be used in determining the location of the object on the data storage system. Element 368 illustrates that the CA for the CDF 364 may be determined and used by an application as the transaction ID or clip ID. The application may use the clip ID in order to retrieve the contents or metadata for an object of the clip 362. Element 370 illustrates how a CA for the CDF may be determined based on the hash value of the CDF and, optionally, one or more other bits of encoded information for the clip.

With reference back to FIG. 4, the application 302 may write a clip including one or more objects to a virtual pool of the data storage system. Virtual pools are described in more detail elsewhere herein. In connection with the foregoing, the application 302 may transmit, using the API 304, the content for each object of the clip to the data storage system 320. In response, the data storage system 320 (e.g., such as software included in CAS layer 322) may return the CA for each object to the API 304. The API 304 may then form the CDF for the clip and transmit the CDF to the data storage system 320. The data storage system may determine the CA for the CDF and return the CA for the CDF to the API 304. The API 304 may return the CA for the CDF to the application 302 as the transaction or clip ID. The application 302 may use the clip ID to subsequently perform operations on an object of the clip. The metadata for each object may include the metadata specified by the API as well as other information determined and returned from the CAS layer 322. For example, as will be described below, a CAS-based implementation may include a feature which automatically generates metadata and includes such metadata into all objects written to a virtual pool. Using the automatic metadata generation feature, the CAS software layer 322 may update the metadata for an object to include the automatically generated metadata. Additionally, the API 304 of the host may also specify that particular metadata is included for an object (e.g., the string ID such as ID1, ID2, and the like). If software, such as the CAS layer 322, of the data storage system auto-populates (such as through the automatic metadata generation described elsewhere herein in more detail) portions of an object's metadata, an embodiment may have the data storage system return such metadata to the API 304 for inclusion in the CDF produced by the API 304. Alternatively, an embodiment may have the CAS layer 322 receive a first version of the CDF from the API 304, may then generate an updated CDF, determine the CA for the updated CDF, and then return the CA for the updated CDF along with the updated CDF to the API 304 of the host. Furthermore, it should be noted that an embodiment may have the API 304 perform additional processing as part of detection of data transmission errors and/or data integrity. For example, an embodiment may have the API 304 determine a CA for each object contents while the API 304 streams the content to the data storage system. The API 304 may then perform an additional step of checking to see whether a first CA, as returned by the data storage system, matches the calculated CA, as determined by the API. If not, the API 304 may determination that there may have been an error in data transmission of the object contents, notify the data storage system of such determination, and then retransmit the object contents believed to be the subject of the erroneous data transmission.

What will now be described are features that may be included in an embodiment of an object-based system, such as an embodiment utilizing the CAS layer 322. Functionality associated with those features may be exposed to a user in varying levels of detail and may also be implemented with varying levels of automation in accordance with application-specific best practices. The varying levels of detail and automation may be in accordance with expected levels of knowledge of a user issuing a request, such as from GUI 332, to provision storage. An embodiment may include additional functionality and features than as described herein as provided by the CAS layer 332 or other object-based system. Features of the CAS layer 332 that may be exposed in varying levels of detail and associated with varying degrees of automated application-specific best practices relate to virtual storage pool configuration, retention classes, automatic metadata generation, and application profiles (or p-files). These features are described in more detail below.

When configuring and provisioning object-based storage for use with an application, the application may be allowed to perform data storage operations on objects included in one or more virtual object pools. As such, a virtual pool may be configured for use with an application as part of processing a request to provision storage for the application. As mentioned above, a virtual pool or virtual object pool may correspond to a logical segregation or partitioning of the object space. An embodiment may allow particular applications access to one or more specific virtual pools containing data for the particular applications. For example, for security and compliance reasons, a medical application may not be allowed to access financial information used by a mortgage application, and vice versa. Furthermore, for a given virtual pool, different types of access and operations may be allowed for a specified application. Thus, part of virtual pool configuration may include specifying attributes related to what application(s) on what host(s) are allowed access to one or more specified virtual pool and also what types of access (e.g., read-only, read existing objects and write new objects, modification to existing object attributes) are permitted. For example, a first virtual pool may contain general information used by both the medical and mortgage applications and both such applications may only be allowed read access to objects included in the first virtual pool. A second virtual pool may contain data used only by the medical application and the medical application is allowed to read and write new objects to the second virtual pool. A third virtual pool may contain data used only by the mortgage application and the mortgage application is allowed to read and write new objects to the third virtual pool. Thus, virtual pools may be used to facilitate data security and compliance. Additionally, having different application(s) access specified virtual pools may be used in connection with performing capacity analysis (e.g., how much storage is being used by the medical application, email application, and the like). To this end, objects written to a particular virtual pool may have their metadata field automatically populated with information identifying the particular application, host writing the data, corporate division or hospital owning the particular application storing the object, and the like. Automatic metadata generation is described in more detail elsewhere herein. Capacity analysis may be useful in connection with determining storage charges and may be tracked by determining, for example, which objects have corresponding metadata identifying particular storage consumers (e.g., applications, hospitals, and the like).

Although virtual object pools may be implemented independent of, and using any desired, underlying physical storage devices and technologies, additionally processing is performed to configure the underlying storage devices for use in storing objects. In other words, virtual pool configuration may also include performing processing required to establish, allocate, or set up the storage of the virtual pool for consumption by the application. Such processing may include selecting various options associated with the lower layers of the file system, block storage, and the like, upon which the object-based storage is implemented, creating one or more file systems, configuring one or more storage devices to have a desired RAID level of protection, and the like. In one embodiment, selection of file system options and block storage options, as well as configuring any RAID groups, creating file systems, and the like, may be performed in an automated fashion in accordance with best practices for the particular application using the virtual pool. Thus, one embodiment of the techniques herein may not expose details regarding the file system layer 324 and block storage layer 326 when a user issues a request to configure storage for an application. Rather, in this embodiment, only details of the CAS layer 322 and functionality related to objects may be exposed to the user and automated in varying levels. In another embodiment, the different levels of user interaction and associated skill may expose varying levels of detail of the CAS layer 322 and, optionally, one or more other lower layers (such as of the file system layer 324 and/or block storage layer 326). Examples of different levels of user interaction and detail as related to layer 324 and 326 are provided in the '231 patent.

Figure 5:
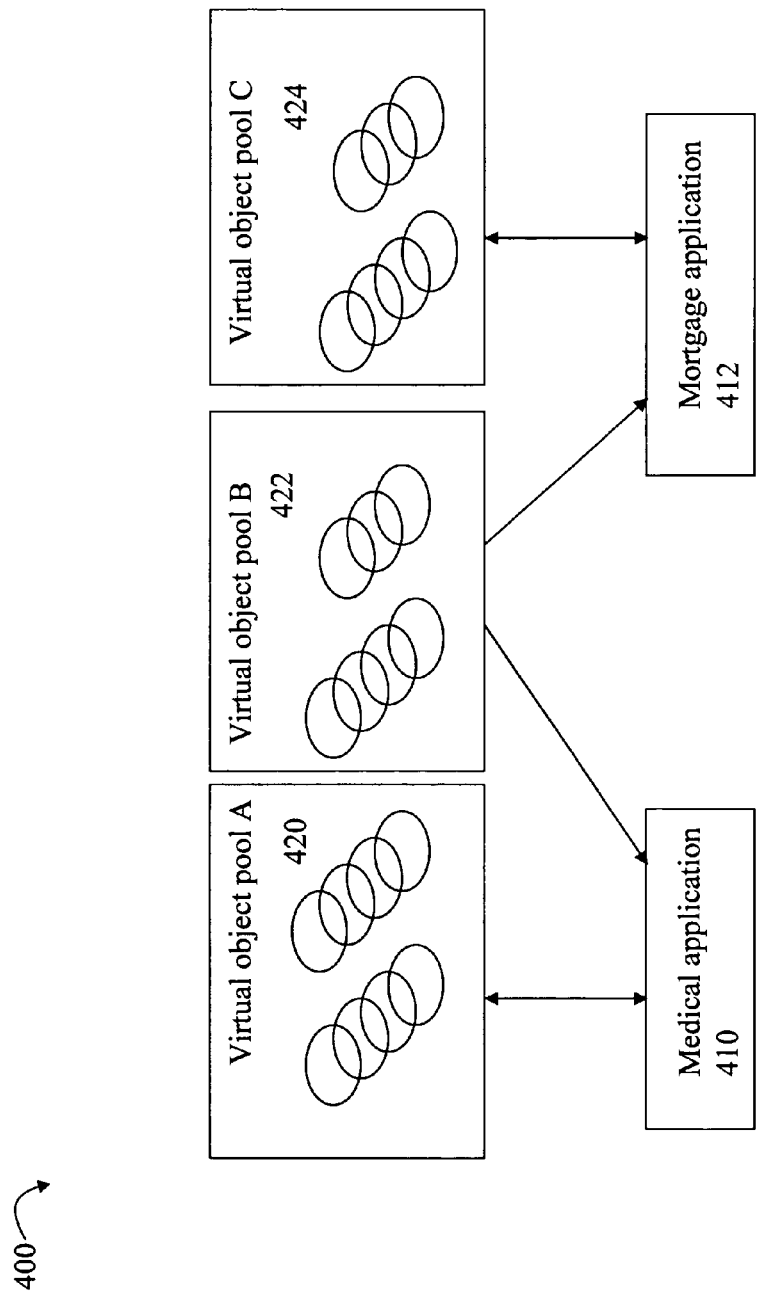
FIGS. 5 and 6 are examples illustrating use of virtual pools.

Referring to FIG. 5, shown is an example illustrating virtual object pools as may be used in an embodiment in accordance with techniques described herein. The example 400 illustrates object space comprising 3 virtual pools 420, 422 and 424. The medical application 410 may have access to pools 420 and 422 and the mortgage application may have access to pools 422 and 424. Pool 422 may represent the common or shared data of the applications 410 and 412. Pool

420 may represent data accessible only to the medical application 410. Pool 424 may represent data accessible only to the mortgage application 412. The example 400 illustrates segregating virtual pools based on application usage. However, as will be appreciated by those of ordinary skill in the art, the logical partitioning of object space into one or more virtual pools may be performed based on the foregoing and/or other criteria.

Figure 6:
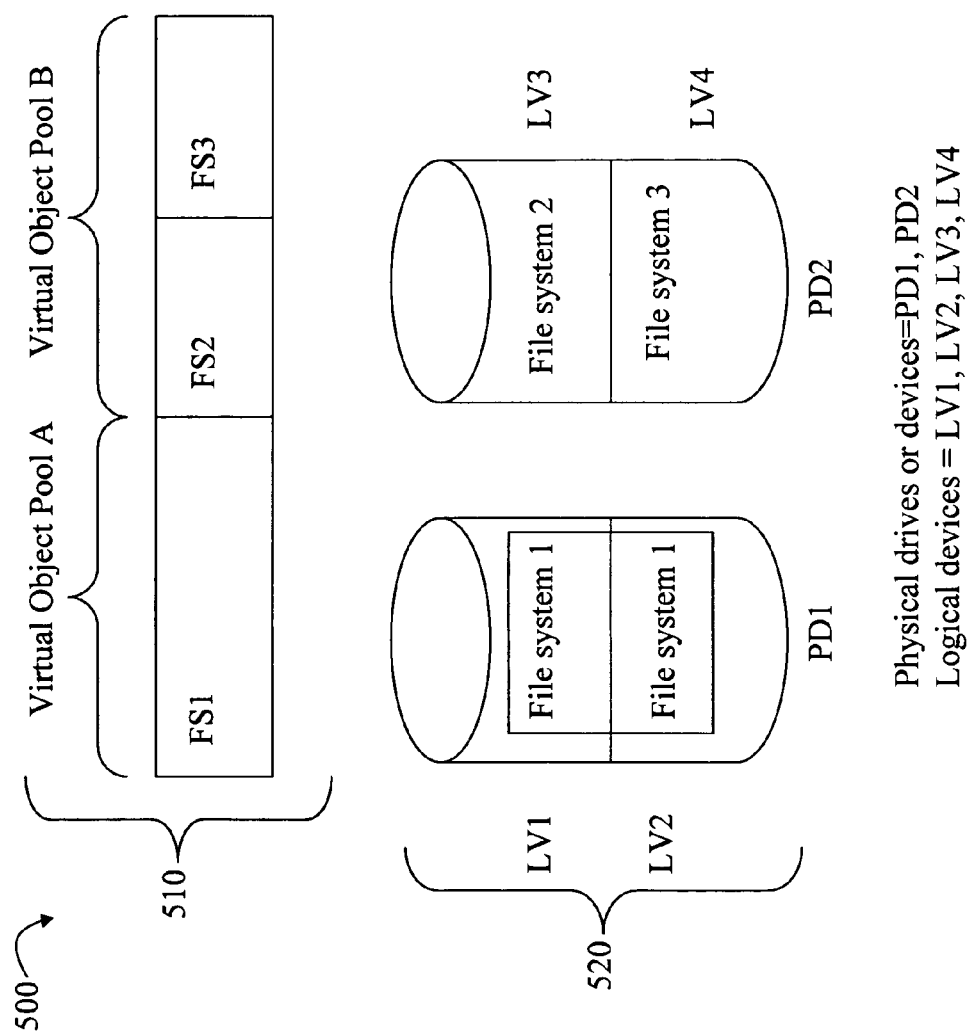

Referring to FIG. 6, shown is an example illustrating how virtual object pools may be configured in an embodiment in accordance with techniques herein. The example 500 illustrates an embodiment in which virtual pool A and virtual pool B are implemented using file systems and block storage layers as described elsewhere herein. Element 510 indicates that virtual object pool A consists of a single file system, FS1 and that virtual object pool B consists of two file systems, FS2 and FS3. As illustrated in FIG. 5, virtual pool A may be used by only the medical application and may be configured using a single file system of a type selected in accordance with the medical application best data storage practices. For example, if the medical application typically has large files over a particular size and the data is typically accessed infrequently (e.g., no more than once every year or other specified time period), the file system FS1 may be of a type particularly suitable for operating on files of at least the particular size and which is accessed infrequently. As also illustrated in FIG. 5, virtual pool B may be used by both the medical application and mortgage application and may be configured using two file systems of a same type or of different types selected in accordance with the best data storage practices for the data typically expected to be stored therein. For example, if the common or shared data stored in virtual object pool B is frequently accessed and typically includes a large number of small files under a particular size, the file systems FS2 and FS3 may be of a type particularly suitable for operating on such files.

Element 520 illustrates the physical and logical devices upon which the storage for the virtual object pools A and B resides. The particular physical devices (PDs) selected may vary with device characteristics also based on expected usage for application-specific best practices. For example, PD2 may be considered a "fast" device having physical device attributes to facilitate quick response times. Similarly, different physical devices may be configured to have a required level of RAID protection in compliance with law, rules and regulations for different types of application data.

In one embodiment in accordance with techniques herein, different aspects of the virtual pool configuration may be exposed and automated for different corresponding levels of user interaction. For example, a novice user may not be exposed to any aspect of virtual pools. A novice or first level user may make a menu selection to configure storage for a specified application. In response, the data storage system may automatically name and configure the virtual pool in accordance with application-specific best practices. As described above, such configuration may include selection of particular physical devices (e.g., based on device attributes), configuring such physical devices to have particular RAID protection, selecting a file system type and creating the file system on the configured physical devices, and the like. A generalist or second level user may be exposed to some aspects of virtual pools. In addition to those options that may be specified by the novice, the generalist may also provide a name for the virtual pool, a size "hint" indicating a typical or average size for each object of the pool, and may indicate an expected level of usage of stored objects (e.g., how frequently the object is expected to be referenced or retrieved). The size hint and/or expected frequency of use of data stored in the pool may be used by the data storage system, for example, in selecting an appropriate file system, selecting an appropriate physical device based on physical device characteristics, and the like. In addition to those options that may be specified by the generalist, an expert or third level user may also specify the particular file system type to use, a number of file systems to create, what physical devices to configure, and the like. With the expert level, the data storage system may use the information provided by the user (e.g., selected physical device, file system type and number, and the like) to override any information that may be specified in accordance with application-specific best practices. Greater levels of expertise and specifying additional details from the user may result in reduced levels of automation. Thus, as illustrated by the foregoing, a user having a particular level of knowledge may accordingly be allowed to specify different information affecting the degree of automation for virtual pools in accordance with best practices as performed by the data storage system.

A retention class may be defined specifying an amount of time that an object is to be retained (e.g., an amount of time that object deletion is disallowed). An object may have one or more attributes and one such attribute may identify a retention class. Object attributes, including specification of a particular retention class, may be provided when a new object is created. Also, an existing object may be modified to specify a selected retention class attribute or modify an existing retention class attribute. A user may be allowed to define a new retention class where the class definition indicates a particular retention time. A user may also be allowed to modify an existing definition for a defined retention class. For example, a first retention class may be defined specifying a 7 year retention time in accordance with existing laws and regulations at a first point in time related to how long a medical office is required to retain patient medical records and data. At a second point in time, there may be a law change so that the required retention time is now 10 years. As such, a user may be allowed to modify the retention time for the first retention class and all existing and new objects having the first retention class attribute may automatically have an updated retention time from 7 to 10 years. The particular operations with respect to retention classes which a user is allowed to perform may vary with the level of user interaction. For example, a level 1 Novice user may have no exposure to retention classes. A novice user may not be allowed to define or modify retention classes. Rather, when provisioning storage for an application, a default retention class may be automatically created for the application. Furthermore, in connection with the automatic metadata feature described below, the data storage system may use a default rule causing any objects subsequently written by the application into a particular virtual pool to be automatically tagged with the default retention class attribute. In connection with the novice user provisioning storage for the application, the data storage system may provide for automatic creation of the default retention class and automatic specification of the retention class as an attribute for all objects created in a particular virtual pool. The foregoing may be automatically performed in accordance with application-specific best practices so that, for example, data used by a first application may be retained for a first time period and data used by a second application may be retained for a second different time period. As part of enforcing retention time periods for objects, an embodiment may use other metadata, such as object creation date, to determine the ending date/time after which an object may be deleted (e.g., ending date/time=creation date/time+required retention time).

Retention classes, associating retention classes and retention times with individual objects or units of data, as well as modifications to retention classes and specified retention periods for objects are described, for example in U.S. Pat. No. 7,249,251, Jul. 24, 2007, Todd et al., METHODS AND APPARATUS FOR SECURE MODIFICATION OF A RETENTION PERIOD FOR DATA IN A STORAGE SYSTEM, which is incorporated by reference herein.

Figure 7:
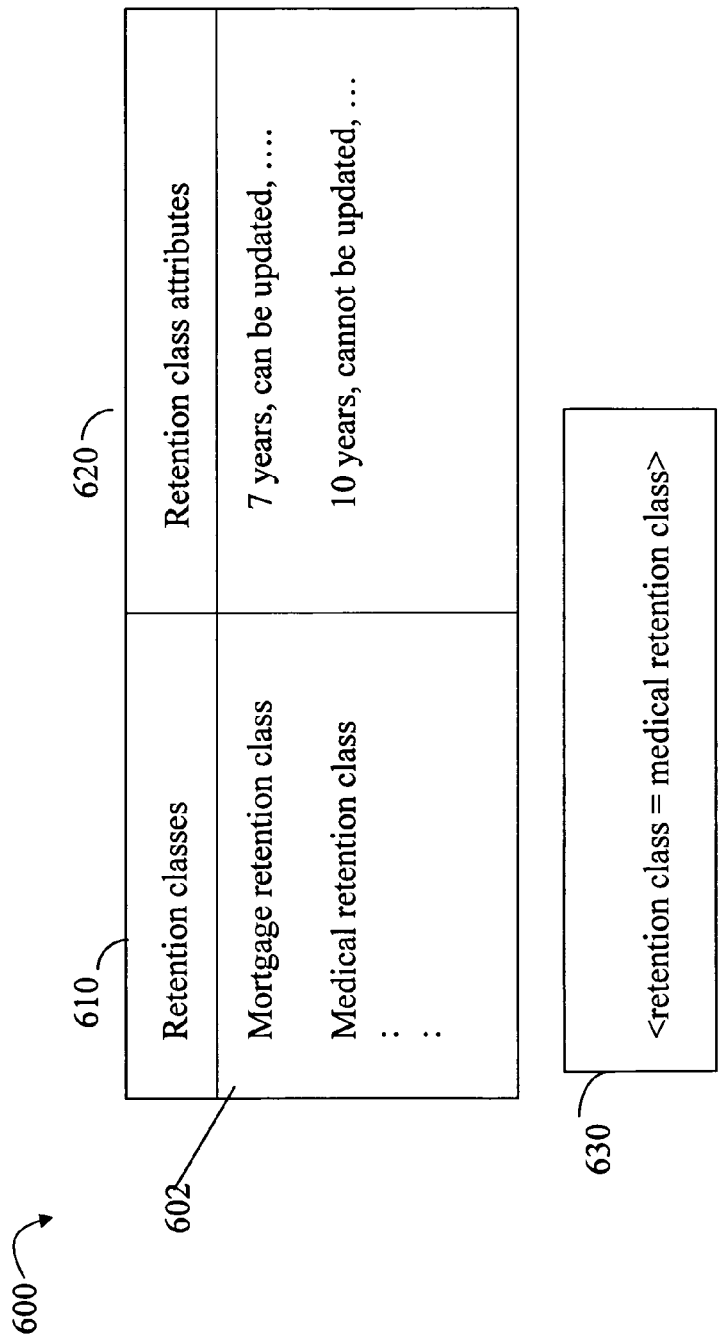
FIG. 7 is an example illustrating retention classes.

Referring to FIG. 7, shown is an example illustrating retention classes as may be used in an embodiment in accordance with techniques herein. The example 600 includes a table 602 of retention classes with a first column 610 naming the defined retention classes and a second column 620 listing the attributes for the defined retention classes. Each line of the table 602 indicates the attributes in 620 which are associated with the named retention class in 610. For example, the mortgage retention class has a retention time of 7 years and the attributes of the mortgage retention class may be updated, for example, to modify the retention time from 7 years to 10 years at a later point in time in connection with a change to a rule, law or regulation. The medical retention class has a retention time of 10 years and the attributes of the medical retention class cannot be updated. The foregoing illustrates that, at the time of creation, a retention class definition may be specified with an attribute indicating whether the retention class definition may be updated at a later point time, or not. In those retention classes that are modifiable, a change to the retention class definition may provide for updating each object having the retention class as an object attribute. The foregoing may prove useful, for example, as an alternative to updating each object individually (e.g., if the object includes an attribute with the retention time specified as an absolute value rather than referencing the retention class as an attribute). Element 630 represents metadata associated with an object. Element 630 illustrates using "name=value" pairs to specify a retention class as an object attribute included in the metadata for the object.

For a particular application writing objects to a virtual pool, an embodiment may provide for automatic metadata generation. In connection with this feature, the data storage system may automatically populate an object's metadata with one or more items of information when the object is initially created and stored in the virtual pool. For example, in connection with provisioning storage for an application, a virtual pool may be configured. Additionally, the data storage system may also be instructed to automatically populate, via default settings and/or application-specific customizations, all objects stored in the virtual pool with one or more items of metadata. To further illustrate, a request may be made using the GUI of FIG. 4 to provision storage for a medical application on host 310. Processing of this request may include configuration of a virtual pool VP1. Additionally, settings for VP1 may be stored on the data storage system where the settings are used when subsequently creating and storing objects in VP1. The settings may include default automatic metadata generation settings provided by the data storage system in accordance with application-specific best practices. As an example, the data storage system may automatically populate each object's metadata with the name and version identifier of the application creating an object. Such information about the application may be included in the request to store or write the object to VP1. The settings may also include customized automatic metadata generation settings as may vary with the level of user interaction with the data storage system. For example, a novice user may not be allowed to customize automatic metadata generation and specify what metadata is automatically included for objects stored in VP1. However, a generalist or expert level user issuing a provision request for the application may specify that one or more additional items of metadata information are included in each object stored in VP1. Thus, the options and settings for automatic metadata generation may be specified in connection with a storage provisioning request and affect the metadata stored with an object and/or transaction in connection with subsequent requests by the application to store an object to VP1. Whether to allow a user issuing a provisioning request to specify automatic metadata generation settings may vary with the level of skill associated with a user interaction level (e.g., novice, generalist, expert). For those one or more levels associated with minimal skill or knowledge, the user may not be provided with the opportunity to modify default automatic metadata generation settings. In one embodiment, the automatic metadata generation may be specified for a particular application and one or more virtual classes used by the application. The automatic metadata generation may be specified for one or more virtual pools used by the application so that when the application stores an object in one of the designated virtual pools, the object metadata is automatically populated to include the specified metadata.

With reference again back to FIG. 4, when the application 302 makes a request to perform an operation with respect to a virtual pool of the data storage system, the API 304 may provide authentication or security-related information. The authentication information for the application may be included in an application profile or p-file stored on the host 310 upon which the application executes (e.g., the host from which the request is issued to the data storage system). The application profile may be created as part of the processing performed in response to the data storage system receiving a storage provision request for the application and the application profile may then be automatically transmitted to the host agent 312. In one embodiment, the GUI 332 or data storage system 320 may create the application profile. The application profile may specify, for example, which application on which host is allowed to access one or more named virtual pools, what operations (e.g., read only, read and write, delete, and the like) can an application perform with respect to one or more named virtual pools. At a later point in time after provisioning is completed and an application makes a request to store data in the provisioned storage, the application provides the profile to the data storage system along with the request. The data storage system then determines whether the request is allowable in accordance with the security information of the application profile. The application profile may be generated automatically in accordance with application-specific best practices as part of processing performed when provisioning storage. Additionally, as may vary with the interaction level (e.g., novice, expert, etc.), a user of the GUI issuing a provisioning request may or may not be allowed to specify input which is used in connection with generating the application profile. For example, in connection with the novice user, the application profile may be automatically generated without exposing the user to any details other than the particular host that the application is to run on. In contrast, for a user interacting with the GUI at an expert level, the user may specify additional application profile information such as the types of access that an application is allowed for one or more virtual pools. It should be noted that such information as described relates to virtual pools but also may affect the generated application profile.

Figure 8:
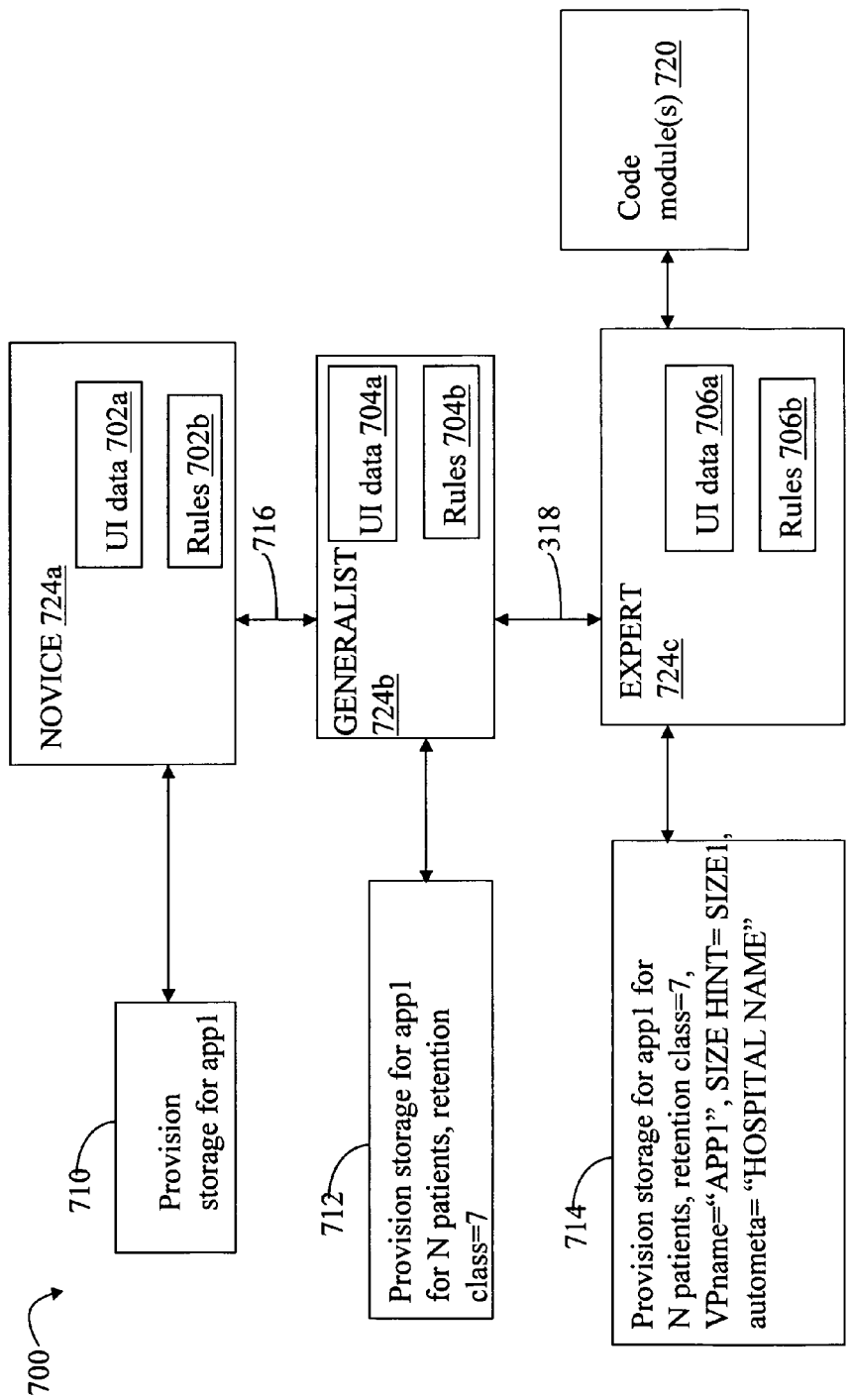
FIGS. 8, 9, 10 and 11 are examples further illustrating use of rules, mappings and different levels of user interaction in accordance with techniques herein.

Referring to FIG. 8, shown is an example illustrating how the different service providers of the data storage system may be used to perform the mapping between levels to perform a data configuration request, and also provide different levels of user interaction.

Elements 724a, 724b, and 724c correspond to the different levels of service providers such as described, for example, in connection with FIGS. 2, 3, and 4. Elements 710, 712 and 714 represent the information obtained via the GUI at the various levels and service providers. Element 710 represents the information obtained for a user connected at level 1 to service provider 724a. Element 712 represents the information obtained for a user connected at level 2 to service provider 724b. Element 714 represents the information obtained for a user connected at level 3 to service provider 724c. Generally, information obtained by a user at level "n" may be subsequently passed on via an API call to one or more other lower level (e.g. greater than "n") service providers in order to perform the user request.

Element 712 may also represent the information communicated by the service provider 724a after the provider 724a applies mapping rules 702b to 710 resulting in an API call of the form as illustrated in 712. Element 714 may represent the information communicated by the service provider 724b after the service provider 724b applies mapping rules 704b to 712 resulting in an API call of the form as in 714

With reference to the example 700, if a user interacts with the system at level 1, the novice service provider 724a obtains the data included in 710 which is passed in form 712 to provider 724b as illustrated by 716. Provider 724b in turn maps data from form 712 to the form 714 as communicated to provider 724c as illustrated by 318. If a user interacts with the system at level 2, the generalist service provider 724b obtains the data included in 712 and passes the data of 712 to provider 724c in the form represented in 714. If a user interacts with the system at level 3, the expert storage service provider 724c obtains the data from the GUI in the form 714. In this example, the provider 724c may implement or execute the one or more operations to perform the request indicated by 714 by invoking one or more other code modules 720. The code modules 720 may communicate with other components on the data storage system (e.g., such as those of other file system and/or block storage layers) to perform the requested task.

In one embodiment, the GUI of FIG. 4 may query each service provider of the data storage system to obtain the appropriate UI data 702a, 704a and 706a via API calls in accordance with a user selected level of interaction using any one of a variety of different techniques as described herein and known to those skilled in the art. The UI data 702a, 704a and 706a may be used to populate the menus and other UI elements that may be displayed to a user.

The example 700 illustrates exemplary user inputs for provisioning storage for a medical application "app1" with interactions at the various levels 1-3 (novice, generalist and expert). Element 710 illustrates the input received from the most basic user level 1, novice, in which the user may enter or select via a menu option a command to provision storage for a selected application. The storage provisioned for medical application app1 with user level 1 interactions uses all default options specified via mapping rules and API calls to levels 2 and 3. For level 2, the parameters input from the user or received via mapping and an API call from level 1 are illustrated in 712. By default, parameters related to a number of patients (e.g., N patients) and retention class (e.g., retention class=7) are specified. For expert level 3, the parameters input from the user or received via mapping and an API call from level 2 are illustrated in 714. At level 3, additional details regarding the provisioning request and the underlying features of the CAS system, such as related to virtual pools and automatic metadata generation, are specified. In the example 700, the generalist at level 2 may have knowledge about retention classes but may not have knowledge regarding the virtual pool and automatic metadata features as exposed at the expert level.

In connection with the bottom most level service provider 724c or service provider associated with the greatest level of user knowledge and detail, 724c may optionally not include and utilize rules 706b. An embodiment may have the language of the user interface map directly with low level calls to code modules to implement the request. In other words, the language terms and parameter values specified by the user at expert level 3 may not require mapping in order to be utilized by the system.

As will be appreciated by those skilled in the art, the examples provided herein may be simplistic for purposes of illustration of the techniques herein. An embodiment may need greater amounts of detail and complexity in order to provide automation of the best practices.

Figure 9:
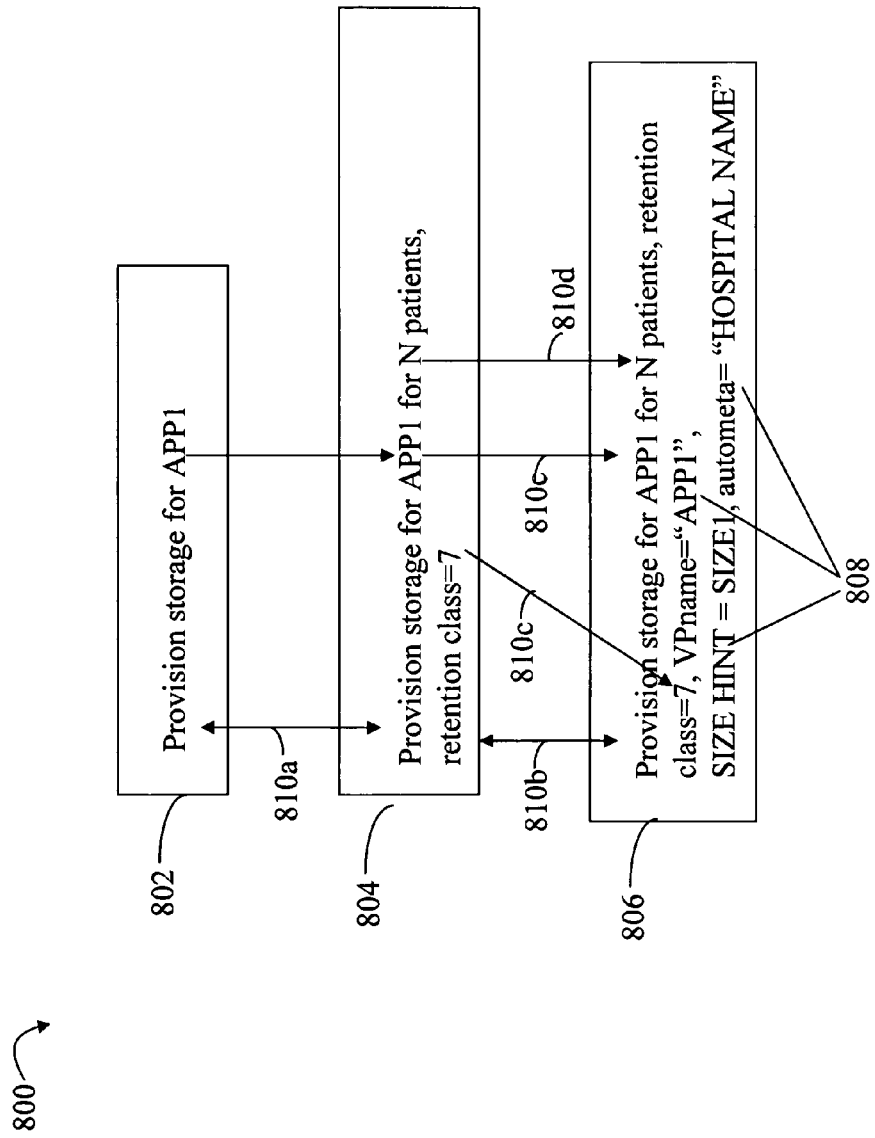

Referring to FIG. 9, shown is another representation of the mapping of the different parameters that may be performed by the rules of the different service providers. The example 800 further illustrates the parameter mapping between levels. Element 802 represents the data obtained by service provider 724a. Element 804 represents the data obtained by service provider 724b via direct user interaction or from provider 724a. Element 806 represents the data obtained by service provider 724c via direct user interaction or from provider 724b. The application name APP1 may be passed 810a as a parameter from level 1 to level 2, and then passed to level 3 810b. Novice Level 1 mapping rules may define defaults based on best practices for the particular application APP1 as indicated by the following parameters: N patients (specifying a default number of patients for which storage is provisioned) and retention class=7 (specifying a default retention class indicating a retention time period of 7 years). Generalist level 2 mapping rules may map the parameters of 804 to parameters of 806 as indicated by 810c, 810d, and 810e. Additionally, generalist level 2 mapping rules may introduce additional default parameter values as indicated by element 808 when interacting with level 3.

A generalist level 2 user may input the number of patients N and the retention class. Otherwise, if a user is interacting at the novice level, rules for mapping novice to generalist level may be used to specify defaults for the number of patients and the retention class.

With reference to 808, the parameter VPname="APP1" may specify the name of a virtual pool created for use with storing objects for APP1. The parameter SIZE HINT=SIZE 1 may specify the expected typical or average size, SIZE1, of an object for a patient. The data storage system may use the foregoing size indicator as a hint in connection with determining an amount of storage that may be allocated for the virtual pool in connection with the N patients parameter. The parameter autometa="HOSPITAL NAME" specifies that all objects subsequently stored in this virtual pool by the application will be automatically populated with object metadata denoting the hospital represented by "HOSPITAL NAME". An expert level 3 user may input the information represented by 808 (e.g., three items to specify the name of the virtual pool, the size hint, and the hospital name) as well as the parameter information for the number of patients N and the retention class (=7). Otherwise, if a user is interacting at the novice or generalist level, rules for mapping generalist to expert level may be used to specify defaults for items indicated by 808 with the remaining items of 806 being passed down from other levels.

As described herein, the user can connect and interact with the data storage system at various levels to perform data provisioning requests. The user may select the level of interaction that can vary with each request. The mapping rules provide for specifying any defaults that may be needed to implement the request. When implementing a same data provisioning request for different applications, the defaults introduced at one or more levels may vary with application. The mapping rules at the different levels allow for implementation of best practices while insulating and abstracting the details from the user. As such, using the techniques herein, a framework may be defined which provides customized interfaces for different user levels of interaction with respect to a particular application when performing data storage provisioning and related operations for the particular application. Rules included in the framework may be selected for use depending on the application and user level of interaction. Rule processing, selection, and the like, as described in the '231 patent may also be used in a similar manner in connection with rules described herein.

Figure 10:
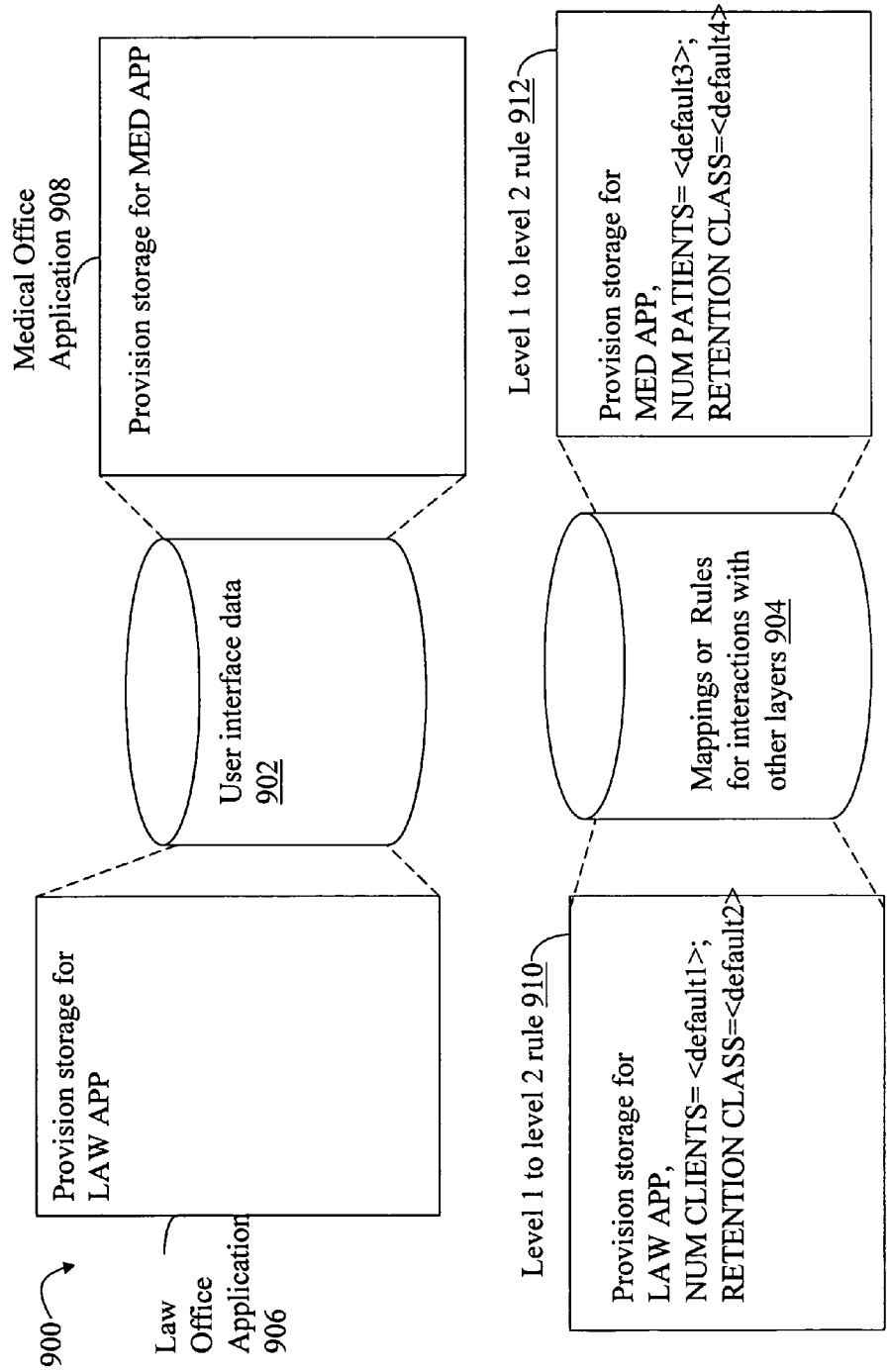

Referring to FIG. 10, shown is an illustration in more detail of rules that may be used in connection with a medical office application and a law office application. As described above, different mappings and rules may be used for each of the two applications in connection with implementing storage provision requests for each application. Additionally, the user interface language terms presented to a user at one or more levels may also vary with the application. For example, the medical office application and the law office application may each have a different set of terms for the UI language at novice level 1. A user may provision storage for both applications but the customers of each application may be in the different market segments, each market segment using different terminology. For example, a medical office may refer to a customer as a patient and the law office refers to its customer as a client and the user interface data 902 presented to a user (such as at the novice and other levels) may reflect this difference in terminology.

The example 900 includes user interface data 902 in connection with a provisioning request to provision storage for the law office application 906 and the medical office application 908. The elements 906 and 908 may each represent the user input with a provisioning request from the novice level. As illustrated, both are requests to provision storage but for different applications. Element 904 (e.g., a data store or container of rules) may include rules 910 and 912. Rule 910 is used for the level 1 to level 2 mapping for the law office application. Rule 912 is used for the level 1 to level 2 mapping for the medical office application. In connection with the request 906 to provision storage for the law application, LAW APP defaults are specified by the data storage system rule set including 910 so that the storage provisioned is based on a number of clients indicated by default1 and the objects stored will have a retention class indicated by default2. In connection with the request 908 to provision storage for the medical application MED APP, defaults are specified by the data storage system rule set including 912 so that the storage provisioned is based on a number of patients indicated by default3 and the objects stored will have a retention class indicated by default4.

Figure 11:
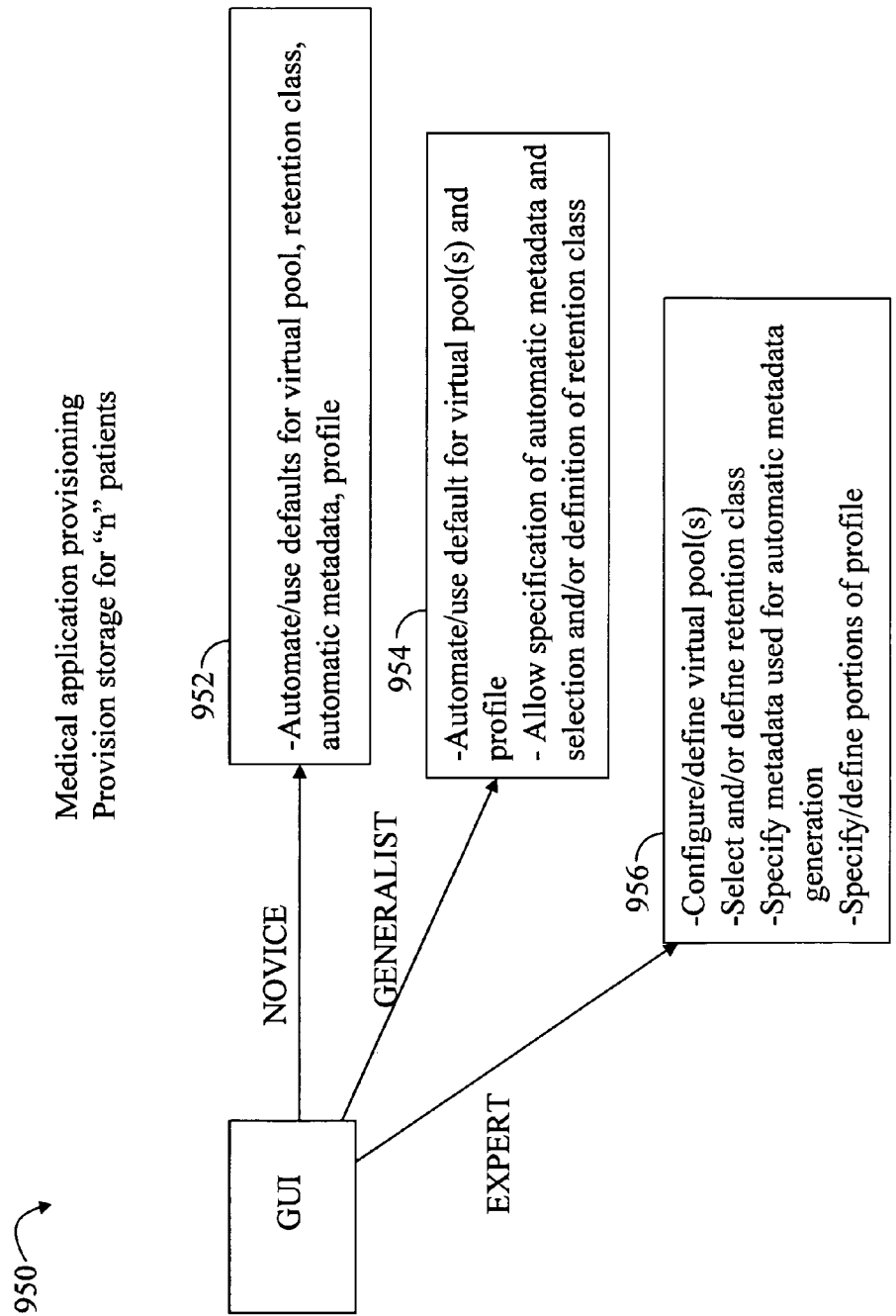

Referring to FIG. 11, shown is an example representing the object-based features and varying degree of automation and exposure in accordance with different levels of user interaction. The example 950 illustrates that users issuing provisioning requests when interacting with the data storage system at different interaction levels may be exposed to corresponding varying levels of detail regarding the CAS or object-based features of virtual pools, retention classes, automatic metadata generation, and application profiles. The example 950 summarizes one way in which varying degrees of automation and exposure to the foregoing features may be associated with each of 3 levels of interaction (e.g., novice, generalist and expert) when provisioning storage for a medical application. The GUI and indicated 3 levels may correspond to those of FIG. 4.

If a user issues a request to provision storage for the medical application at the novice level, the user may select the application from a menu and indicate the host where the application is to execute. The foregoing may be the only inputs provided by the novice user. As indicated by element 952 for the novice level, the data storage system may automate the provisioning process using only the foregoing inputs based on defaults and application specific best practices that may be embodied, for example, in rules and rule processing or using other techniques. In particular, the application best practices as encoded in rules of the data storage system may specify defaults used to automate storage provisioning in connection with virtual pool creation and configuration, application profile generation and copying to the desired host, retention classes, and automatic metadata generation for the virtual pools used by the application.

If a user issues a request to provision storage for the medical application at the generalist level as represented by 954, the user may select the application from a menu and indicate the host where the application is to execute. The data storage system may automate the creation and configuration of one or more virtual pools for the application and also for the application profile in accordance with application specific best practices. However, for a virtual pool created for use by the application with the request, the user may also specify a retention class and may also specify one or more items of metadata automatically associated with each object stored by the application in the virtual pool. Thus, the generalist may have knowledge of some particular features of the object-based system as related to retention class and automatic metadata generation without having additional knowledge regarding virtual pool configuration and the application profile. As such, the appropriate features about which the generalist has knowledge may be exposed to the user. Those features about which the generalist is not knowledgeable may utilize the automated and default best practices of the data storage system. It should be noted that in connection with the generalist level, the user may also be permitted to perform other operations and functions related to the particular feature retention classes. For example, a generalist may be allowed to define a new retention class or modify an existing retention class.

If a user issues a request to provision storage for the medical application at the expert level as represented by 956, the user may select the application from a menu and indicate the host where the application is to execute. The expert level user may be allowed to specify and perform operations in connection with virtual pools, retention classes, application profiles and automatic metadata generation. Thus, in connection with an expert level user, the user may optionally minimize the level of automation performed by the data storage system with respect to the foregoing object-based features by specifying his/her own inputs rather than relying on defaults selected by the data storage system in accordance with application-specific best practices.

The foregoing is an example of how control and automation (with respect to object-based features such as may be provided by the CAS layer 322 of FIG. 4) may vary for different levels of user interaction. As also described herein, the data storage system may automate implementation of CAS using other software layers, such as file system layer 324 and block storage layer 326, in accordance with application-specific best practices and defaults embodied in rules and rule processing as well as other suitable techniques.

Figure 12:
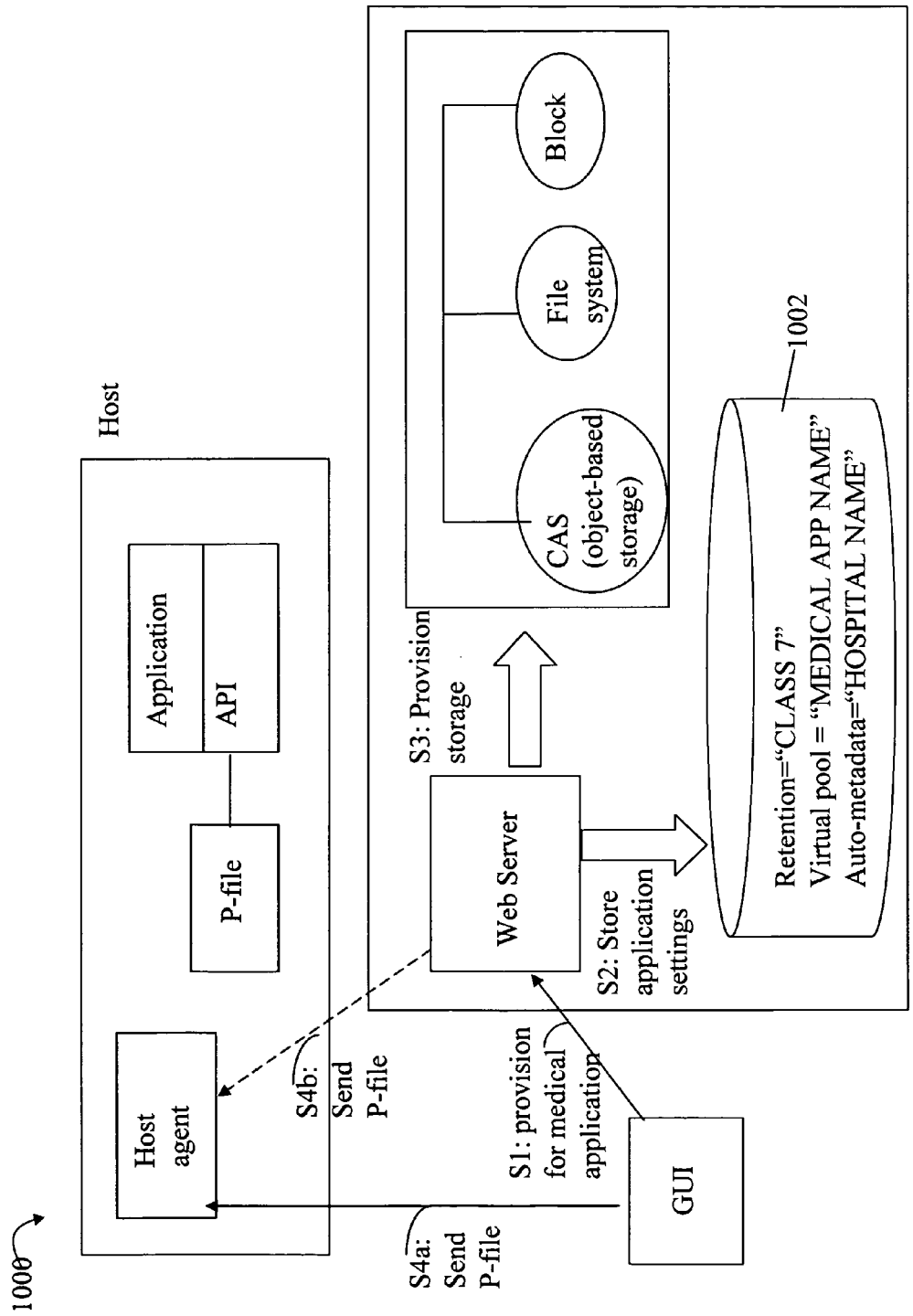
FIG. 12 is another example illustrating data flow and interaction between components of a system in accordance with techniques herein and FIGS. 13 and 14 are flowcharts illustrating processing steps that may be performed in accordance with techniques herein.

Referring to FIG. 12, shown is an example 1000 of processing that may be performed in connection with a provisioning request in an embodiment in accordance with techniques herein. The example 1000 provides additional detail and illustrates a flow of processing steps as described above that may be performed in connection with issuing a request to provision storage for use with an application such as a medical application, executing on a host. FIG. 12 includes elements described above in connection with other figures, such as FIG. 4. As a first step S1, a user may issue the request to the data storage system using the GUI. In this example, the user may be interacting at a novice level where the user selects the medical application for which storage is being provisioned. The user also selects the host upon which the medical application will execute. In one embodiment, discovery processing may have been previously performed to obtain information regarding what hosts have connectivity to the GUI and data storage system and also what applications are executing on particular hosts. The user may be presented with a menu populated with appropriate portions of the foregoing discovery information so that a selection of a host and medical application executing thereon may be made. The host and medical application may be included in the provisioning request sent to the web server as indicated by S1. The web server may perform processing to provision the storage in accordance with defaults and best practices for the medical application. In this case, rules and rule processing may result in automatic specification of application settings which may be stored in a step S2 on the data storage system. Such settings as indicated by 1002 may include a virtual pool name indicating the virtual pool to be created for the medical application provisioning request, a retention class defined and included as a metadata attribute for all objects created by the application and stored in the virtual pool, and metadata that is automatically generated and included for all objects created by the application and stored in the virtual pool. The settings of 1002 may be used in connection with subsequent requests by the medical application, for example, to store objects in the virtual pool. Part of the automated processing may include creating the retention class definition as needed in addition to specifying that the retention class is to be included as an automatically generated portion of metadata for all objects stored in the named virtual pool "MEDICAL APP NAME".

In a step S3, the web server communicates with CAS and other software layers in order to provision the requested storage and create the virtual pool. As described herein in more detail, the data storage system includes code which embodies the template or process for provisioning storage for the medical application. Such processing may include, for example, configuring one or more block storage devices with appropriate device attributes, RAID level, and the like. One or more file systems may then be provisioned on the devices just configured. The foregoing one or more file systems may serve as the data store or container from which the CAS objects are created for use with the medical application.

The web server and/or GUI may then perform processing to automatically create the application profile or p-file and then also transmit the p-file to the host agent. The p-file may be transmitted to the host agent by the GUI (S4a), or alternatively by the web server (S4b) depending on which component(s) create the p-file. The host agent may store the p-file for subsequent use by the API when issuing requests to operate on objects of the virtual pool "MEDICAL APP NAME".

An embodiment in connection with techniques herein may preconfigure block and/or file system level storage prior to receiving a provisioning request. For example, a data storage system may configure physical devices into RAID groups having a desired level of data protection prior to receiving any provisioning requests. Alternatively, processing for configuring the block and/or file systems used for a provisioning request may be performed in response to receiving the request.

The data storage system may also perform other processing in connection with requests made by an application, such as the medical application, to store an object in the virtual pool. For example, the data storage system may expect that all objects stored in a named virtual pool by the medical application should have a particular file format. For the medical application, the data storage system may expect that the content for an object has a particular format such as in accordance with a defined standard. If the content is not in accordance with this format, the data storage system may refuse to store objects having content which is of an unexpected format. The expected file format may be indicated in the application settings 1002. The CAS software layer of the data storage system may use information contained in metadata and/or object content in order to make a determination as to whether to accept/reject a write operation to write the object content. The file format of the object content may be determined, for example, by examining portions of the content to determine whether the portions contain an expected signature value. For example, one or more fields of the object content may be required by the standard to have one of a plurality of expected values. The fields may be checked to see if they contain valid values in accordance with the standard. Portions of the object metadata may also be examined. For example, a file format may be specified in object metadata communicated from the host. Thus, a determination as to whether to accept or reject object content for storage in a virtual pool may be based on interpretation of content in accordance with the expected signature and/or examination of object metadata.

As another example, the data storage system may accept or reject a request to store an object having content larger than a specified threshold size. The threshold size may also be specified and stored in the settings 1002. The data storage system may determine the size of received object content and use the threshold size to determine whether to allow the object content to be stored in the virtual pool. Application settings and options, such as the required file format and threshold size, may be specified by a user as a customization (e.g., as an input provided with the provisioning request) or using best practice application-specific defaults as described above in connection with other settings.

Figure 13:
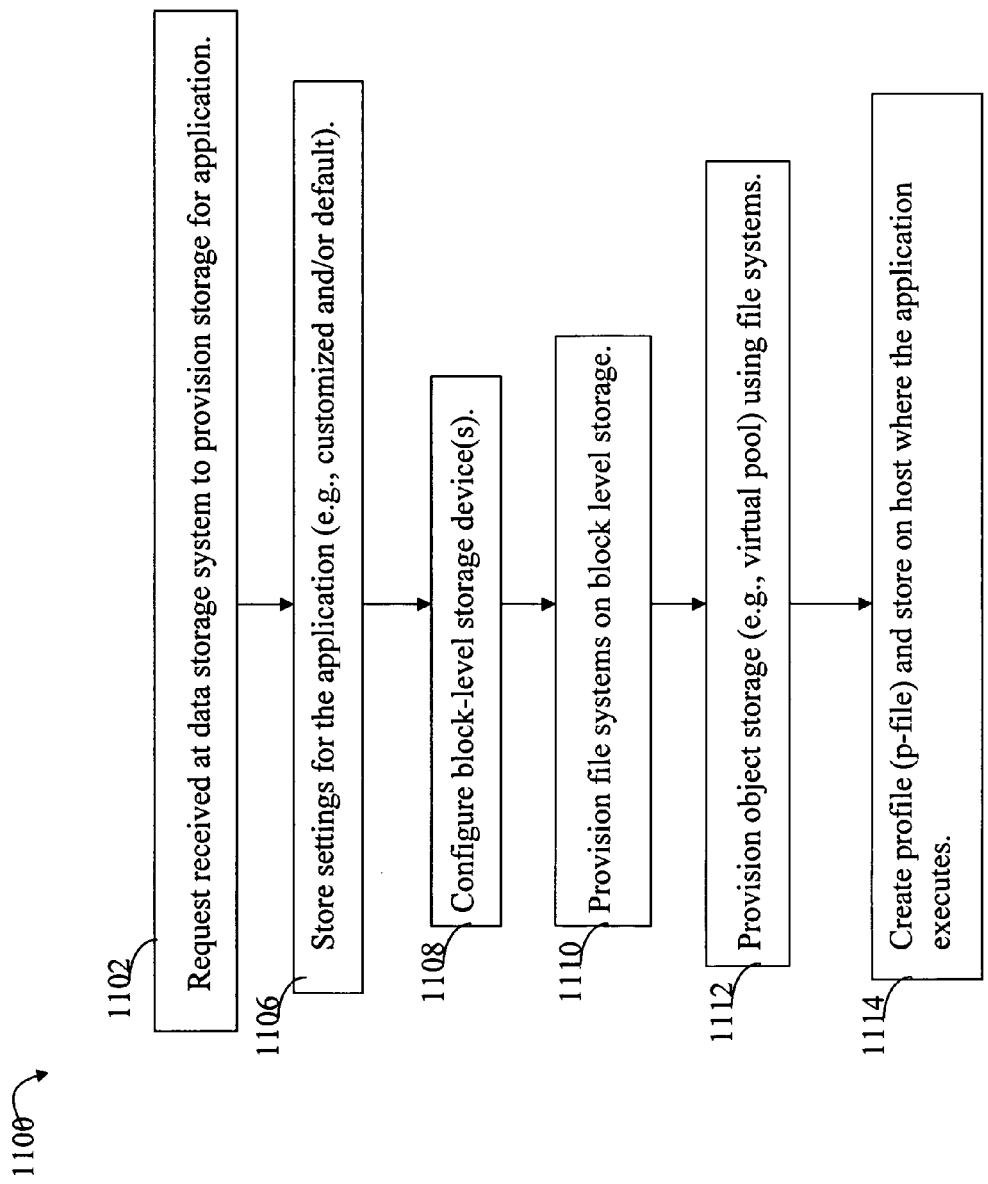

Referring to FIG. 13, shown is a flowchart of processing steps that may be performed in an embodiment in accordance with techniques herein for provisioning storage for an application. The flowchart 1100 summarizes processing described above. At step 1102, a request is received at the data storage system from the GUI to provision storage for a specified application. The request may optionally include one or more other inputs in accordance with the level of user interaction and any such information may also be transmitted to the data storage system. At step 1106, the settings for the application may be stored on the data storage system. The settings may include customized settings (e.g., as may be specified with the request based on additional user inputs) and/or default settings (e.g., as may be automatically provided by the data storage system in accordance with application specific best practices). At step 1108, the block level storage device(s) may be configured. At step 1110, the file system(s) may be provisioned on the block level storage devices configured in step 1108. At step 1112, the object storage or virtual pool may be provisioned using the file system(s) of step 1110. At step 1114, the application profile is created and stored on the host where the application executes (e.g., host from which the application will issue requests to operate on objects of the virtual pool). As noted above, the processing of steps 1108, 1110 and 1112 may vary with how the virtual object pools are implemented in an embodiment. Additionally, the foregoing processing of steps 1108, 1110 and/or 1112 may be performed prior to receiving the provisioning request in step 1102.

Figure 14:
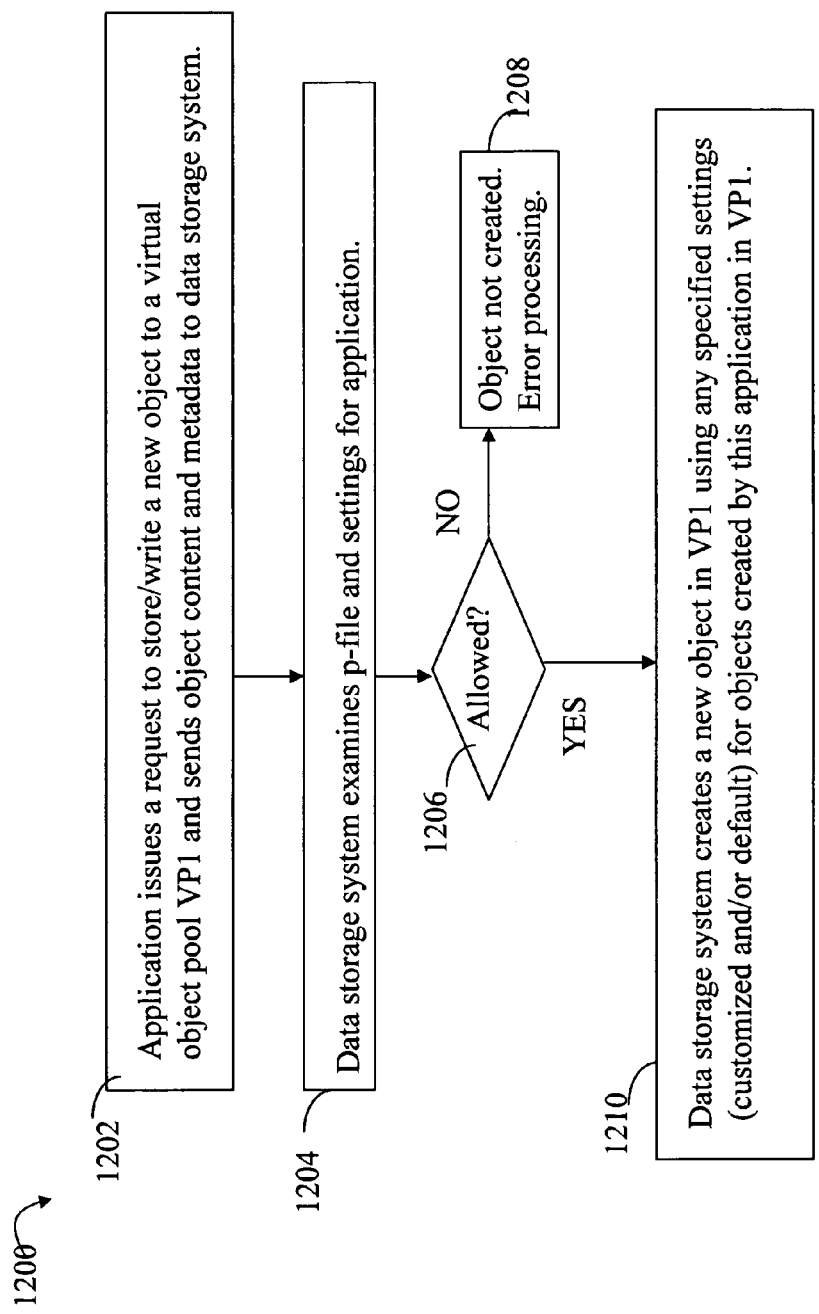

Referring to FIG. 14, shown is a flowchart of processing steps that may be performed in an embodiment in accordance with techniques herein in connection with an application issuing a request to perform an operation with respect to an object of a virtual pool. The flowchart 1200 summarizes processing described above as may be performed by an application of a host for which storage has already been provisioned (such as by performing the steps of FIG. 13). At step 1202, the application issues a request to perform an operation with respect to an object of the virtual pool VP1. In this example, the operation may be to store or write a new object. Step 1202 may include sending the object content, metadata, and an application profile or p-file to the data storage system. It should be noted that as described above, a clip or transaction may include one or more objects, for purposes of illustration, only a single object is described with respect to FIG. 14. At step 1204, the data storage system examines the p-file and optionally the application settings and, at step 1206, determines whether to allow the requested operation. If step 1206 evaluates to no, step 1208 is performed. At step 1208, the operation is not performed (e.g., object not created/stored) and error processing may be performed to return a message to the requesting host and application. If step 1206 evaluates to yes, control proceeds to step 1210 to perform the requested operation. For example, if the operation is to create and store a new object in VP1, the new object is created and its content and metadata stored using any specified settings (e.g., automatic metadata generation, retention class, and the like, as may be specified in the settings for VP1). It should be noted that an embodiment may also include processing in addition to that of FIG. 14 for automatic metadata generation as described above. Furthermore, the data storage system may generally use the p-file when determining whether an application is allowed to perform any object operation including a request to write or store an object to a virtual object pool.

As described herein, an embodiment may use any one of a variety of different object-based software layers and implementations. For example, described above are exemplary embodiments using CAS. As another example, an embodiment may use an object-based technique implemented in accordance with the XAM (Extensible Access Method) industry standard for object addressable storage.

The foregoing provides a flexible approach for automated implementation of best practices that can be customized in accordance with the particular application, data service, and/or data storage system. The best practices may vary with application as well as the particular data storage system. A user may select a level of interaction with the system in which the level selected varies the assumed knowledge or user sophistication, level of detail, and level of automation for the particular application. The user may select a level, such as a novice level level 1, to obtain a greater level of automation of best practices customized for the particular application. A user may also select to obtain a lesser level of automation of best practices as the user knowledge level and sophistication increases. The selected level may be associated with a particular user interface, level of automation and interaction with the data storage system for performing data services for a particular application. The automation of the best practices may be implemented using a variety of different frameworks and infrastructures. The exemplary one set forth herein, such as described in more detail in the '213 patent, uses a rule-based system although it will be appreciated by those skilled in the art that others are possible when implementing the techniques set forth herein.

The foregoing techniques provide for ease of use with automated configuration of an object-based storage system, such as a CAS system, for an application. In one embodiment, requesting the data storage system provision storage for a particular application causes automatic provisioning of virtual pools, automatic creation and specification of retention classes, automatic specification of metadata, and automatic generation and transmission of an application profile. Additional information may be provided with a request to provision storage for the application in accordance with a selected level of user interaction based on user knowledge where the additional information may be used to override defaults and/or limit the degree to which certain features are automated.

An embodiment may implement the techniques herein using code executed by a computer processor. For example, an embodiment may implement the techniques herein using the rules, rules engines, and the like, using code which is executed by a processor of the data storage system. As will be appreciated by those skilled in the art, the code may be stored on the data storage system on any one of a computer-readable medium having any one of a variety of different forms including volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a data storage system processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A computer implemented method of provisioning storage for an application comprising:

receiving a request to provision object-based storage for the application in a data storage system, the request identifying the application and being received from a user interface interacting with the data storage system at a specified one of a plurality of user levels, each of said plurality of user levels being associated with a different level of abstraction with respect to first processing performed in implementing the request; and performing said first processing to provision object-based storage for the request, said first processing being determined in accordance with the application and including a level of automation varying in accordance with the specified one user level at which the user interface interacts with the data storage system, said automation including selecting one or more default options in accordance with best practices of the application, wherein when the specified one user level is a first of the plurality of levels, the request is not allowed to customize metadata automatically included in objects subsequently created in a designated virtual storage pool, and when the specified one user level is a second of the plurality of levels, said second level indicating a level of skill higher than said first level, the request is allowed to customize metadata automatically included in objects subsequently created in the designated virtual storage pool, wherein the request includes at least one hint that is user-specified when interacting at the second level and said at least one hint is not specified when interacting at the first level, said at least one hint indicating any of an average size of an object in the designated virtual storage pool and an expected frequency of object use for objects of the designated virtual storage pool, wherein said first processing uses said at least one hint in selecting any of a file system and physical device used for provisioning storage for the request.

2. The method of claim 1, wherein the first processing includes automatically configuring at least one virtual storage pool for storing objects used by the application.

3. The method of claim 2, wherein the at least one virtual storage pool is configured using at least one default value determined in accordance with best practices for the application.

4. The method of claim 3, wherein the at least one default value is specified in a rule of a rule set which is processed as part of said first processing.

5. The method of claim 1, wherein the plurality of user levels includes a first level associated with a novice user providing a greatest level of abstraction and automation of all of said plurality of levels.

6. The method of claim 1, wherein each of said plurality of user levels allows for specifying a varying degree of optional input with the request in accordance with a level of abstraction associated with said each user level.

7. The method of claim 2, wherein automatically configuring said at least one virtual storage pool includes automatically configuring at least one block storage device in accordance with best practices for the application.

8. The method of claim 7, wherein automatically configuring said at least one virtual storage pool includes automatically configuring at least one file system on said at least one block storage device, said at least one file system being selected in accordance with best practices for the application, and automatically configuring said at least one virtual storage pool on said at least one file system.

9. The method of claim 1, further comprising:
storing one or more settings for the application wherein at least a first of the settings is specified as an additional user-provided input when interacting with the data storage system at a first of said plurality of user levels, and wherein, when interacting with the data storage system at a second of said plurality of user levels rather than said first user level, said first setting is automatically specified by a default value rather than as said additional user-provided input.

10. The method of claim 2, wherein said first processing includes automatically creating a first default retention class and indicating that objects which are created by the application and stored in a first of the at least one virtual storage pool each have an attribute of the default retention class, the default retention class indicating an amount of time that said each object is not allowed to be deleted from the first virtual storage pool.

11. The method of claim 2, wherein each object stored in the object-based storage system is stored in one of a plurality of virtual storage pools, each of said plurality of virtual storage pools being associated for use with one or more particular applications.

12. The method of claim 2, wherein said first processing includes automatically determining a level of access including allowable operations that may be performed by the application with respect to objects included in the at least one virtual storage pool.

13. The method of claim 11, wherein said each object includes content and object metadata.

14. The method of claim 13, wherein the object metadata includes a content-based address determined based on the content of said each object.

15. The method of claim 8, wherein said at least one file system is selected based on any of an expected size and expected frequency of use associated with objects included in said at least one virtual storage pool.

16. The method of claim 9, wherein said first processing includes storing a first object having associated first content with a first format and storing the first object is not allowed if the associated first content having the first format is not in accordance with an expected file format for the application, and wherein the settings for the application include a size and the expected file format, wherein a request to store the first object in a virtual storage pool is not allowed if the associated first content and associated first metadata for the first object are not in accordance with the settings.

17. The method of claim 9, wherein the settings for the application identify at least one portion of metadata that is automatically included in object metadata for each object stored in said at least one virtual storage pool.

18. The method of claim 1, wherein said one or more default options are encoded in rules processed by the data storage system and wherein said first processing includes generating an application profile including authentication and, security information for use by the application when issuing a request to operate on an object, and providing the application profile to a host agent of the host where the application is configured to execute.

19. The method of claim 16, wherein determining whether the associated first content of the first object is in accordance with the expected file format includes examining a portion of the associated first content to determine whether the portion contains an expected signature value for the expected file format.

20. The method of claim 16, wherein the associated first metadata of the first object specifies a file format of the associated first content and said determining includes examining the associated first metadata to determine whether the file format of the first metadata is in accordance with the expected file format of the settings.

21. A non-transitory computer readable medium comprising executable code stored thereon that:
receives a request to provision object-based storage for an application in a data storage system, the request identifying the application and being received from a user interface interacting with the data storage system at a specified one of a plurality of user levels, each of said plurality of user levels being associated with a different level of abstraction with respect to first processing performed in implementing the request; and performs said first processing to provision object-based storage for the request, said first processing being determined in accordance with the application and including a level of automation varying in accordance with the specified one user level at which the user interface interacts with the data storage system, said automation including selecting one or more default options in accordance with best practices of the application, wherein when the specified one user level is a first of the plurality of levels, the request is not allowed to customize metadata automatically included in objects subsequently created in a designated virtual storage pool, and when the specified one user level is a second of the plurality of levels, said second level indicating a level of skill higher than said first level, the request is allowed to customize metadata automatically included in objects subsequently created in the designated virtual storage pool, wherein the request includes at least one hint that is user-specified when interacting at the second level and said at least one hint is not specified when interacting at the first level, said at least one hint indicating any of an average size of an object in the designated virtual storage pool and an expected frequency of object use for objects of the designated virtual storage pool, wherein said first processing uses said at least one hint in selecting any of a file system and physical device used for provisioning storage for the request.

* * * * *